US012534936B2

(12) United States Patent
Alvarez et al.

(10) Patent No.: US 12,534,936 B2
(45) Date of Patent: Jan. 27, 2026

(54) ELECTRIC STRIKE FOR A SLIDING DOOR LATCH

(71) Applicant: Hanchett Entry Systems, Inc., Phoenix, AZ (US)

(72) Inventors: Gerardo Alvarez, Chapala (MX); David Moroyoqui, Tlajomulco de Zúñiga (MX); Joshua T. Peabody, Phoenix, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 261 days.

(21) Appl. No.: 18/446,856

(22) Filed: Aug. 9, 2023

(65) Prior Publication Data

US 2025/0052092 A1 Feb. 13, 2025

(51) Int. Cl.
*E05B 47/00* (2006.01)

(52) U.S. Cl.
CPC ..... *E05B 47/0047* (2013.01); *E05Y 2201/474* (2013.01); *E05Y 2900/531* (2013.01)

(58) Field of Classification Search
CPC ............ E05B 47/0046; E05B 47/0047; E05B 47/0696; E05B 63/0052; E05B 63/24; E05B 63/244; E05B 63/246; E05B 63/248; Y10T 292/696; Y10T 292/699; Y10T 292/702
See application file for complete search history.

(56) References Cited

U.S. PATENT DOCUMENTS 4,613,176 A * 9/1986 Kelly .................. E05B 47/0002 292/DIG. 60
4,626,010 A * 12/1986 Hanchett, Jr. ....... E05B 47/0046 292/341.16
4,676,537 A 6/1987 Esser
5,076,625 A 12/1991 Oxley
5,484,180 A * 1/1996 Helmar ............... E05B 47/0047 292/201
6,082,791 A * 7/2000 Frolov ................ E05B 47/0047 292/201

(Continued)

OTHER PUBLICATIONS

Antonov, Ventseslav, "Extended European Search Report", European Patent Application No. 24193937.0 filed on Aug. 9, 2024, mailed on Jan. 27, 2025, Munich, Germany.

*Primary Examiner* — Kristina R Fulton
*Assistant Examiner* — Noah Horowitz
(74) *Attorney, Agent, or Firm* — Woods Oviatt Gilman LLP; Dennis B. Danella, Esq.

(57) ABSTRACT

An electric strike for use with a sliding door is provided. The strike comprises a housing defining a cavity including first and second walls, each having first and second slots defined therein. A keeper is disposed within the cavity and movable between latched and unlatched positions. The keeper includes first and second ends, wherein each includes respective outwardly extending first and second keeper pins. The first and second keeper pins extending from each end of the keeper are disposed in the respective first and second slots. A blocking member is pivotably mounted to the housing and includes first and second portions. The second portion of the blocking member is engaged with the first keeper pin when the first portion of the blocking member is selectively engaged with a plunger of an actuating mechanism in the first engaged position to selectively maintain the keeper in the latched position.

38 Claims, 23 Drawing Sheets

(56) References Cited

U.S. PATENT DOCUMENTS

| | | | | |
|---|---|---|---|---|
| 6,179,351 | B1 * | 1/2001 | Stendal | E05B 47/0047<br>292/335 |
| 7,273,241 | B2 * | 9/2007 | Milo | E05B 47/0046<br>70/279.1 |
| 7,722,097 | B2 * | 5/2010 | Schnarr | E05B 47/0047<br>292/201 |
| 8,807,606 | B2 * | 8/2014 | Ross | E05B 47/0047<br>292/341.15 |
| 9,945,153 | B2 * | 4/2018 | Scheffler | E05B 15/022 |
| 11,761,242 | B2 * | 9/2023 | Sims | E05B 47/0047<br>292/341.16 |
| 11,866,959 | B2 * | 1/2024 | Sims | E05B 63/0056 |
| 2004/0212197 | A1 | 10/2004 | Shoemaker | |
| 2008/0136200 | A1 * | 6/2008 | Wittke | E05B 65/0025<br>292/341.16 |
| 2019/0203503 | A1 * | 7/2019 | Chang | E05B 47/0696 |

* cited by examiner

ELECTRIC STRIKE FOR A SLIDING DOOR LATCH

TECHNICAL FIELD

The present invention relates to a door lock system for securing a sliding door to a door frame; and more particularly, to a door lock system including an electric strike having a rotatable keeper configured to selectively engage a door latch and controllably release the door latch from the electric strike so that the door may be slid open relative to the door frame.

BACKGROUND OF THE INVENTION

It is known in the art to use a mortise lock 11 to secure a sliding door 12 to a door frame 14 as seen in FIG. 1A. With additional reference to FIG. 1C, mortise lock 11 typically includes a hook latch 18 that is configured for rotating between an engaged position and a released position using a manual cylindrical key lock or thumb turn mechanism (not shown). In the engaged position, hook latch 18 is positioned within a standard strike 20*a* (FIG. 1B) that is mounted in door frame 14 to secure sliding door 12 to door frame 14. To move hook latch 18 to the released position, the thumb turn knob or the cylindrical key lock mounted on door 12 is turned to rotate hook latch 18 out of standard strike 20*a*. Once hook latch 18 is removed from standard strike 20*a*, sliding door 12 can be slid to its open position relative to door frame 14. However, there are instances when electrified (non-manual) configurations are desired. For instance, in the case where controlled access through the door opening is desired using key fobs, key cards, or key pads, the manual cylindrical key lock or thumb turn mechanism are not adequate.

An alternative to using standard strike 20*a* is to use the prior art electric strike 20*b* shown in FIGS. 1D and 1E, namely, the eff eff Electric Strike Sliding Door Model 112KL-GY manufactured by Assa Abloy. Electric strike 20*b* is mounted in door frame 14 and includes a keeper 25 rotatably mounted to the strike housing about a fixed axis of rotation 27 that is parallel to the rotational axis 31 of hook latch 18. Due to the clearance that is required within the strike cavity to allow keeper 25 to rotate between an engaged position (FIG. 1E) and a disengaged position (not shown), the cut-out pocket 14*a* (FIG. 1F—diagonal lined section; FIG. 1B) in frame 14 for standard strike 20*a* needs to be significantly enlarged 14*b* (heavy hatched section) and new mounting points established prior to installation of electric strike 20*b*, as illustrated in FIG. 1F. The requirement to significantly modify the cut-out pocket 14*a* in door frame 14 to the enlarged cut-out 14*b* increases the time and expense associated with the installation of the electric strike 20*b*.

Accordingly, what is needed is a door lock assembly for a sliding door that reliably and consistently allows the sliding door to be released from the door frame and slid to an open position within the door frame while also eliminating the need to significantly modify the cut-out packet. It is an object of the present invention to address this need, as well as other needs.

SUMMARY OF THE INVENTION

Briefly described, one aspect of the present invention is directed toward an electric strike for use in conjunction with a door latch system of a sliding door, wherein the door latch system includes a door latch selectively moveable between a latched position and an unlatched position. The door strike comprises a strike housing, an actuating mechanism, a keeper, and a blocking member. The strike housing defines a strike cavity, wherein the strike housing includes a first wall and a second wall opposing the first wall. A first slot is defined in the first wall, and a second slot is defined in the second wall. The actuating mechanism includes a plunger selectively moveable between a first engaged position and a second released position. The keeper is disposed within the strike cavity and movable between a latched position and an unlatched position. The keeper includes a first end and a second end, wherein each of the first end and the second end include respective outwardly extending first and second keeper pins. The first and second keeper pins extending from the first end of the keeper are configured for being disposed in the first slot, and the first and second keeper pins extending from the second end of the keeper are configured for being disposed in the second slot. The blocking member is pivotably mounted to the strike housing about a first axis, and includes a first portion and a second portion. The second portion of the blocking member is engaged with the first keeper pin extending from the first end of the keeper when the first portion of the blocking member is selectively engaged with the plunger in the first engaged position to place the keeper in the latched position.

Other aspects of the present invention are also provided. For example, the first slot may include a stem portion and a leg portion, wherein the stem portion is oriented generally perpendicular relative to the leg portion. The stem portion of the first slot may include a first end and a second end, wherein the first end of the first slot is coterminous with a top edge of the first wall, and wherein the second end of the stem portion extends toward a bottom edge of the first wall. Further, the leg portion of the first slot may include a first end and a second end, wherein the first end of the leg portion intersects the second end of the stem portion of the first slot at a first vertex, and wherein the second end of the leg portion extends toward a third wall of the strike housing that extends between the first wall and the second wall. The stem portion may include a flared portion adjacent to the first vertex. For example, the stem portion of the first slot includes an inner edge and an outer edge, wherein the inner edge includes the flared portion. In another example, the distance between the inner edge and the outer edge at the second end may be greater than the distance between the inner edge and the outer edge at the first end. When the keeper is in the latched position, the first keeper pin is located at the first vertex of the first slot and the second keeper pin is located at the second end of the leg portion of the first slot. When the keeper is in the unlatched position, the first keeper pin is located at the first end of the stem portion of the first slot and the second keeper pin is located at the first vertex of the first slot.

In addition, the electric strike may further include a first extension spring having a first end and a second end, wherein the first end of the first extension spring is coupled to the blocking member at a first point, wherein the second end of the first extension spring is coupled to the first keeper pin of the first end of the keeper at a second point, and wherein the first extension spring biases the keeper towards the latched position. The first axis, the second point, and the plunger may be co-linear with one another to provide stability to the keeper.

The electric strike may further include a second extension spring having a first end and a second end, wherein the first end of the second extension spring is coupled to the strike housing, wherein the second end of the second extension spring is coupled to a roll pin disposed adjacent to the second end of the keeper, and wherein the second extension spring biases the keeper towards the latched position.

The keeper may further include a sidewall extending between the first end and the second end of the keeper, wherein the sidewall defines a latch cavity configured to receive the door latch therein. The sidewall of the keeper may further include an extended sidewall portion configured to retain the door latch within the latch cavity when the keeper is in the latched position, wherein the extended sidewall portion is configured to release the door latch from the latch cavity when the keeper translates and rotates from the latch portion to the unlatched position as the door is moved to an open position.

The electric strike may further include a plunger support wall mounted to the strike housing, wherein the plunger support wall is configured for being disposed adjacent to the plunger when the plunger is in the engaged position to provide support to the plunger.

In another aspect, the present invention includes a method for selectively securing a door within a door frame, wherein, the method comprising the steps of: a) providing an electric door strike as described above; b) placing the plunger in engagement with the first portion of the blocking member so that the second portion of the blocking member is engaged with the first keeper pin on the first end of the keeper to place the keeper in the latched position and retain the door latch in a latch cavity defined by the keeper; c) operating the actuating mechanism to disengage the plunger from the first portion of the blocking member; and d) allowing the keeper to be placed in the unlatched position by an opening force being imposed on the keeper by the door latch through the movement of the door toward an open position, wherein the keeper is placed in the unlatched position through a translational and rotational movement caused by sliding the first keeper pin and the second keeper pin on each of the first end and second end of the keeper within the first slot and the second slot, respectively, to allow the door latch to be removed from the latch cavity.

Numerous applications, some of which are exemplarily described below, may be implemented using the present invention.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

Figure 1A:
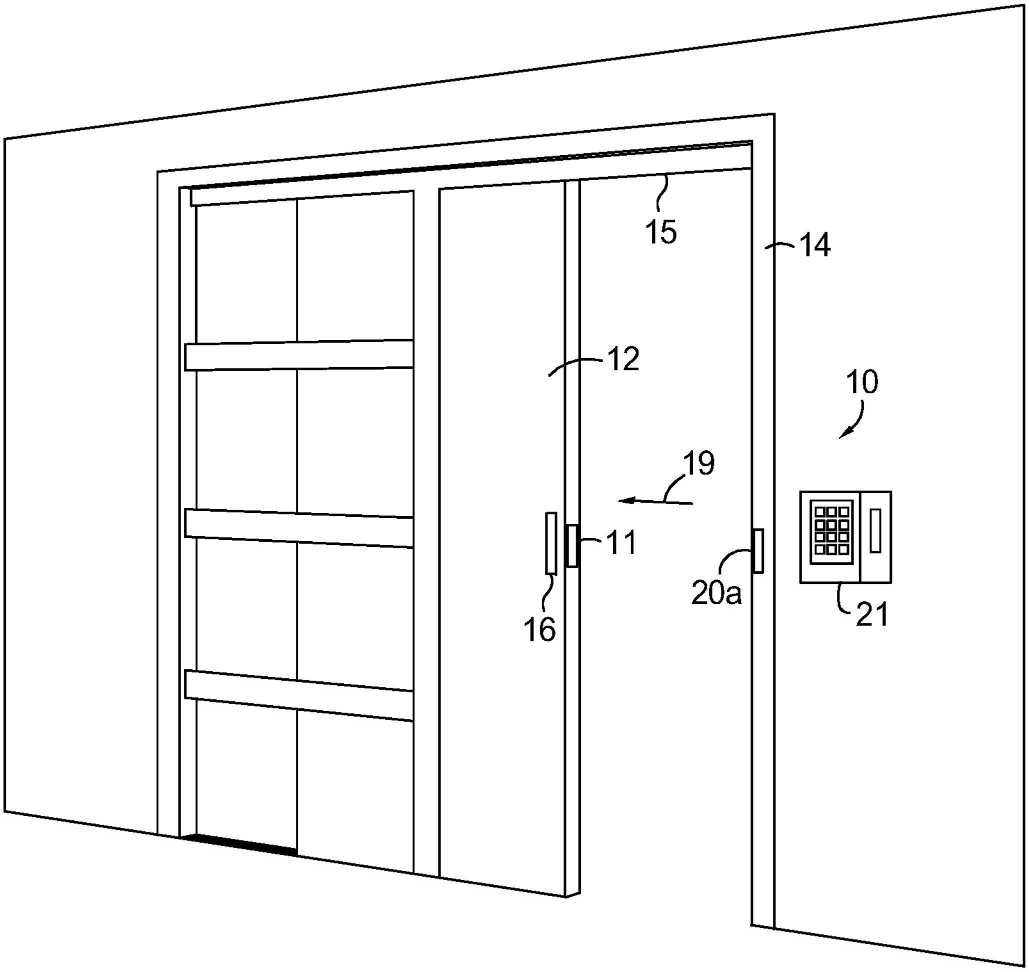
FIG. 1A. PRIOR ART
FIG. 1A is a schematic view of a sliding door comprising a door lock system including a prior art standard strike mounted in a door frame.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Referring to the drawings, and initially to FIG. 1A, a door lock system 10 for use with a sliding door 12 is provided. Sliding door 12 may be any type of sliding door, including, but not limited to, a pocket door that is configured to be slid into a cavity of a wall, or a sliding door that is slid within its own frame (e.g., sliding glass door). In either case, door 12 is configured to be selectively secured to a door frame 14 using door lock system 10 to prevent access through a door opening defined by door frame 14. Door 12 may include a handle 16 that may be used to move the door 12 between opened and closed positions relative to door frame 14.

Door lock system 10 comprises a door latch 18 that may be mounted to or otherwise associated with door 12. As will be described in more detail below, latch 18 may be a hook style latch that is pivotally mounted to door 12. For example, and with additional reference to FIG. 15A, latch 18 may include a base portion 18*a* that may be positioned within door 12 so that latch 18 can be pivotally connected to door 12. Latch 18 further includes a hook portion 18*b* that is configured to extend outwardly from an end portion of door 12 so that it can interface with door frame 14 to secure door 12 to door frame 14. While latch 18 is described herein as being mounted to door 12, it should be understood that latch 18 may also be mounted to door frame 14 when used with a pair of doors and operate in a similar manner. Further, latch 18 is merely an exemplary type of latch that may be used in door lock system 10, and other types of latches are also contemplated herein.

Figure 2:
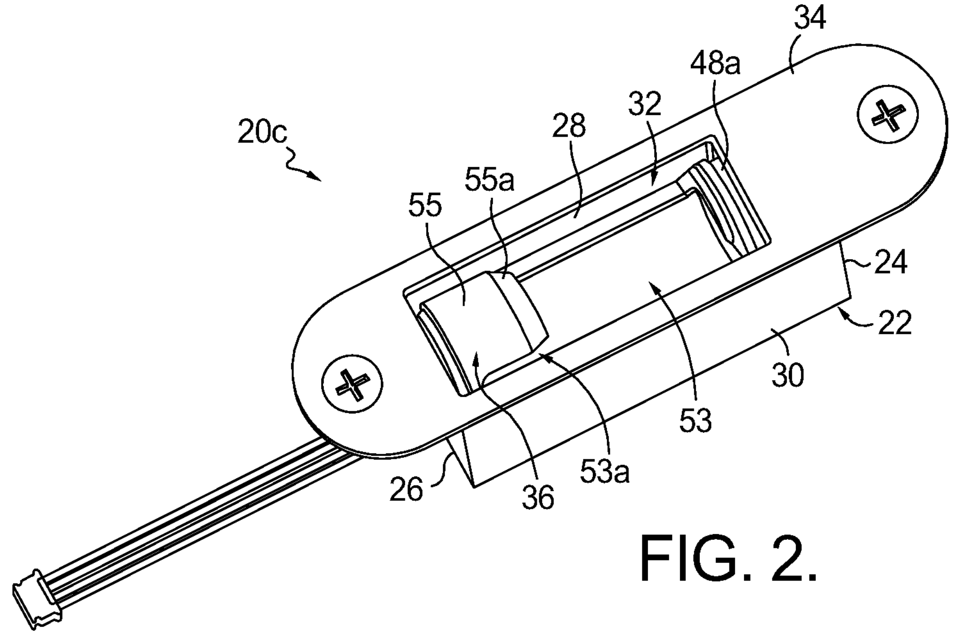
FIG. 2 is a front perspective view of one embodiment of an electric strike in accordance with the present invention.
Figure 3:
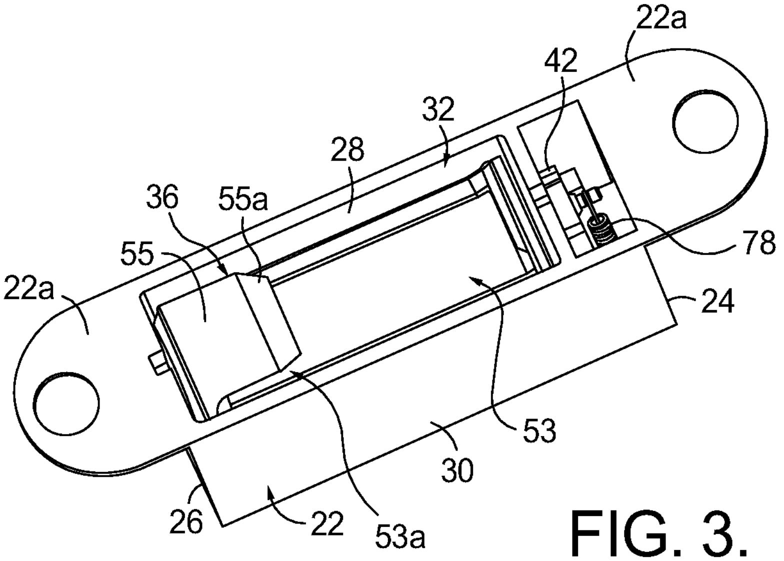
FIG. 3 is a front perspective view of the electric strike shown in FIG. 2 with a cover plate removed.
Figure 4:
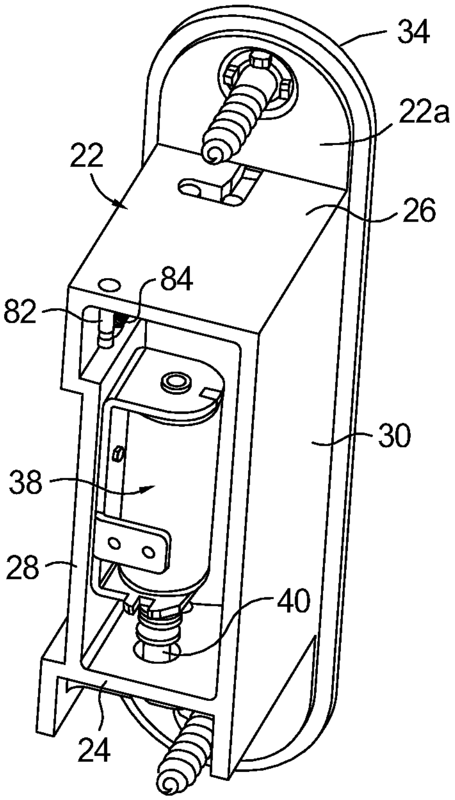
FIG. 4 is a rear perspective view of the electric strike shown in FIG. 2.
Figure 17A:
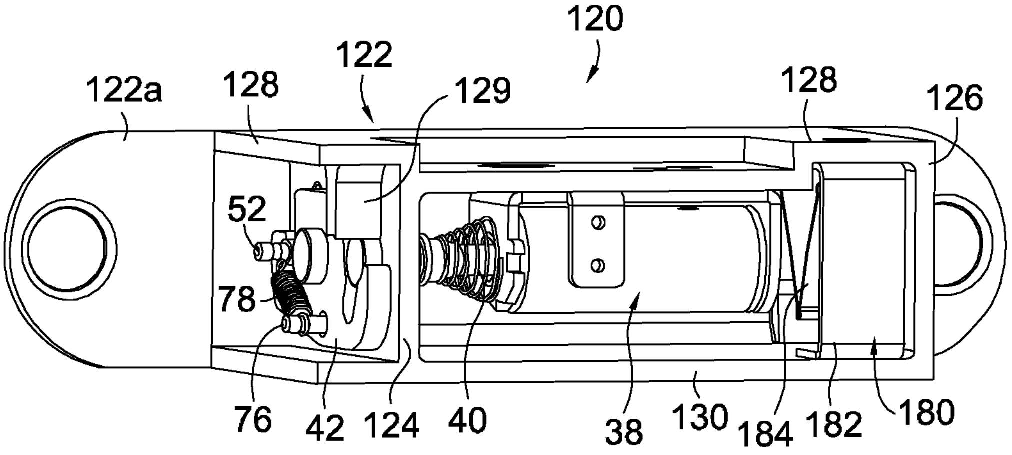
FIG. 17A is a bottom perspective view of an alternative embodiment of an electric strike in accordance with the present invention.
Figure 17B:
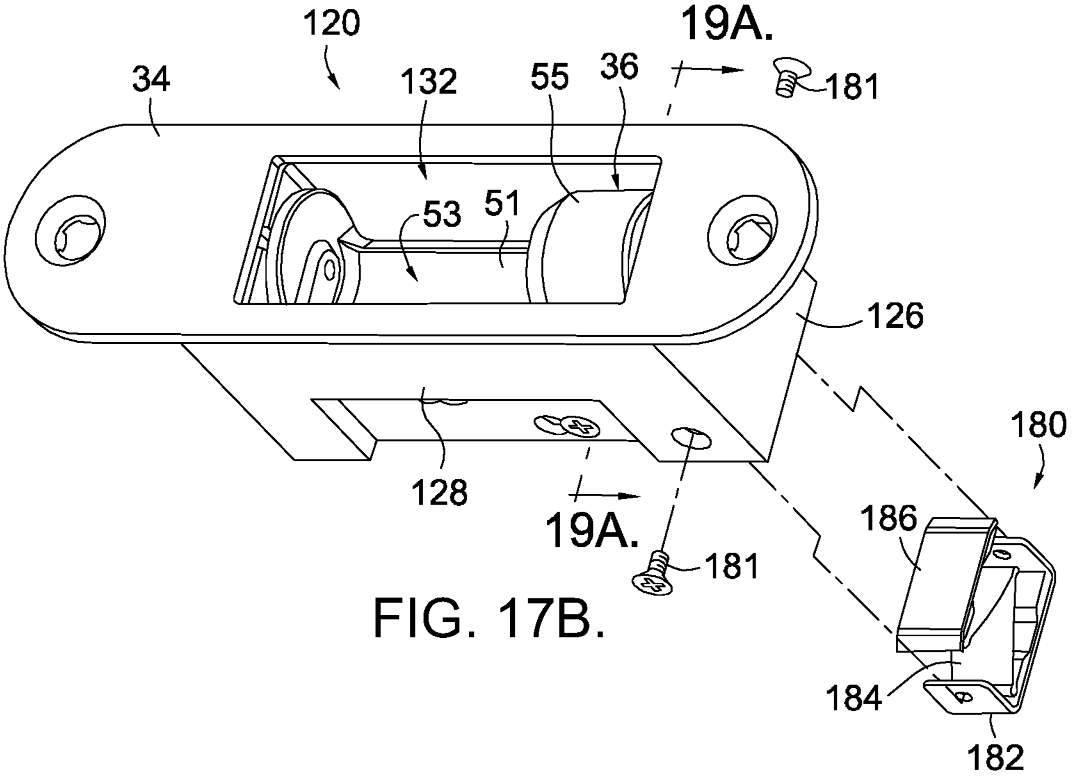
FIG. 17B is a top perspective view of the electric strike shown in FIG. 17A.

In accordance with an aspect of the present invention, door lock system 10 further comprises an electric strike 20*c* (FIG. 2), 120 (FIGS. 17A and 17B), 220 (FIG. 20A) that operates to selectively engage door latch 18 to maintain door 12 in a closed position relative to door frame 14. As will be described in more detail below, electric strike 20*c*, 120, 220 may be operated to release door latch 18 so that door 12 may be slid open relative to door frame 14. In order to initiate the release of door latch 18 from electric strike 20*c*, 120, 220, an authentication device 21, such as a keypad, swipe card reader, key fob reader or biometric sensor may be provided whereby electric strike 20*c*, 120, 220 is actuated only upon input of proper access credentials at authentication device 21 to allow door latch 18 to be removed from electric strike 20*c*, 120, 220 and door 12 to be slid open.

Figure 5:
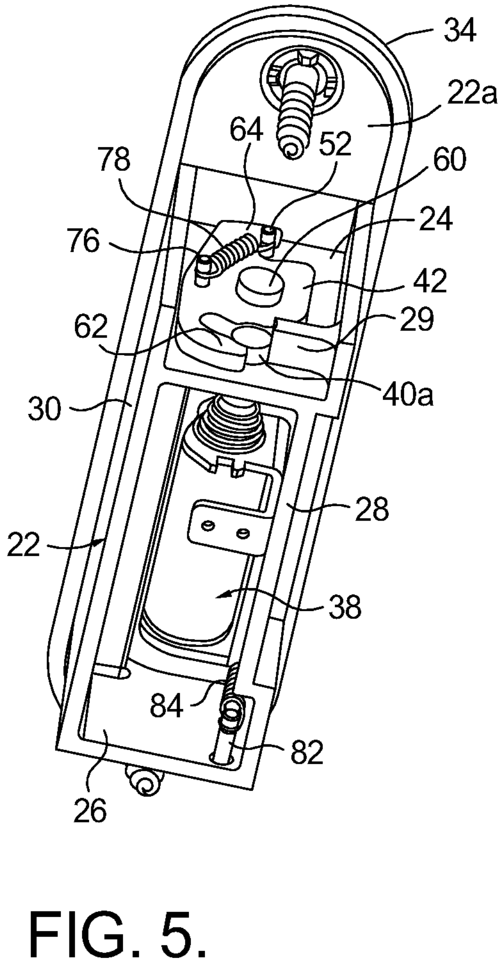
FIG. 5 is a rear perspective view of the electric strike shown in FIG. 2, and rotated 180 degrees relative to the view shown in FIG. 4.
Figure 6:
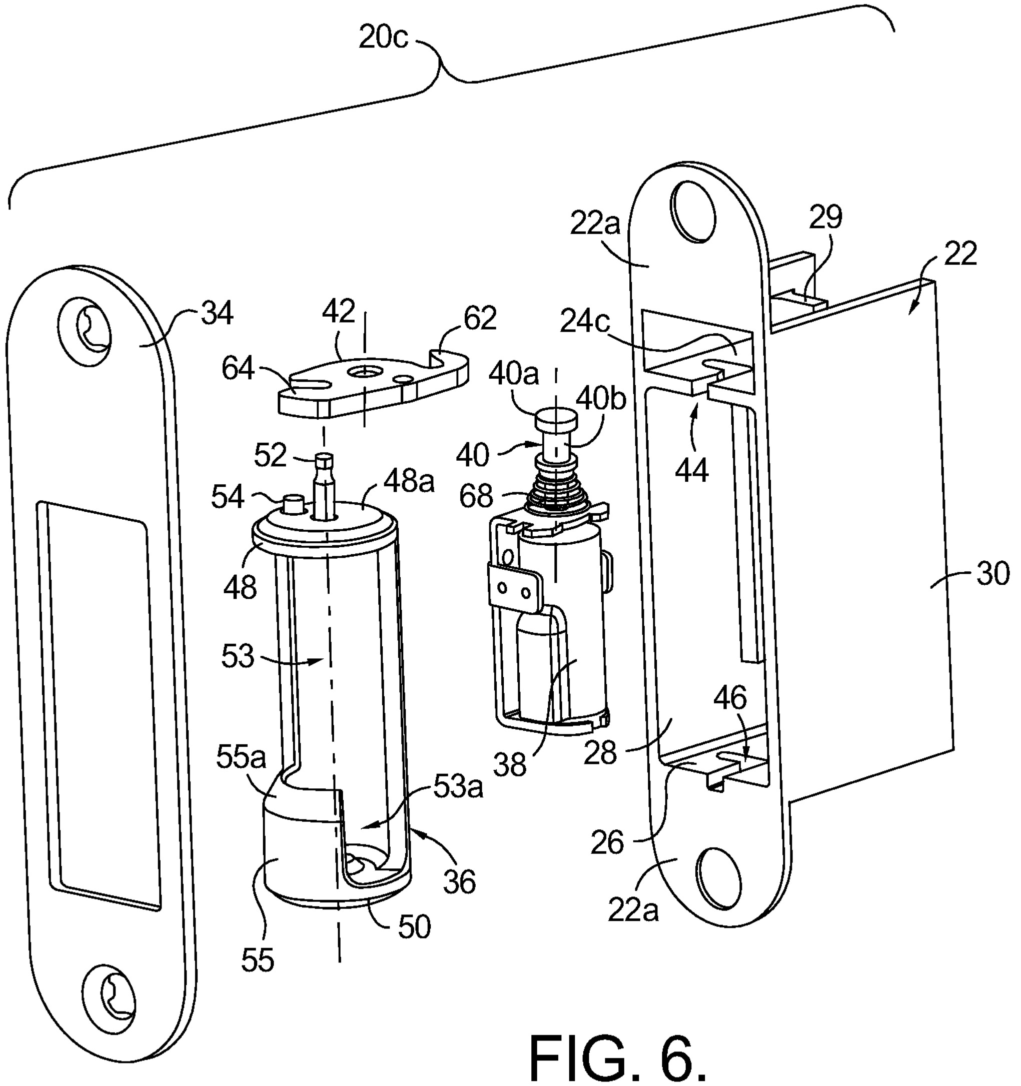
FIG. 6 is an exploded view of the electric strike shown in FIG. 2.
Figure 7:
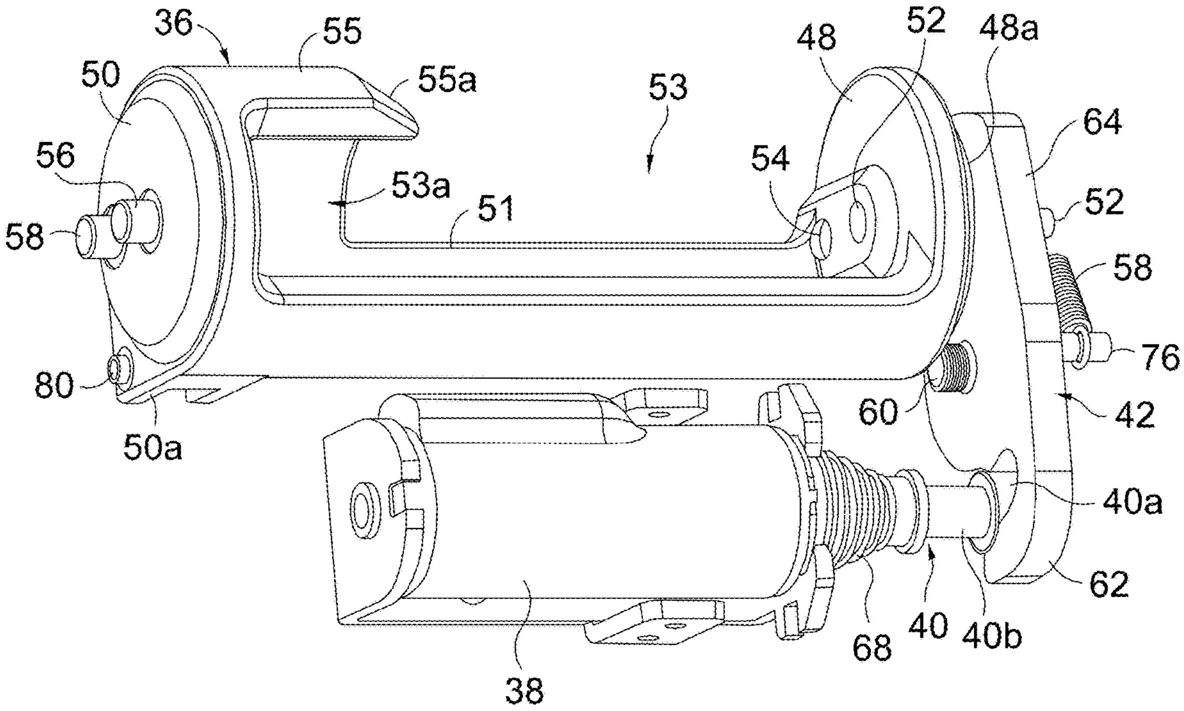
FIG. 7 is a front perspective view of a keeper, a solenoid, and a blocking member of the electric strike shown in FIG. 2.
Figure 8:
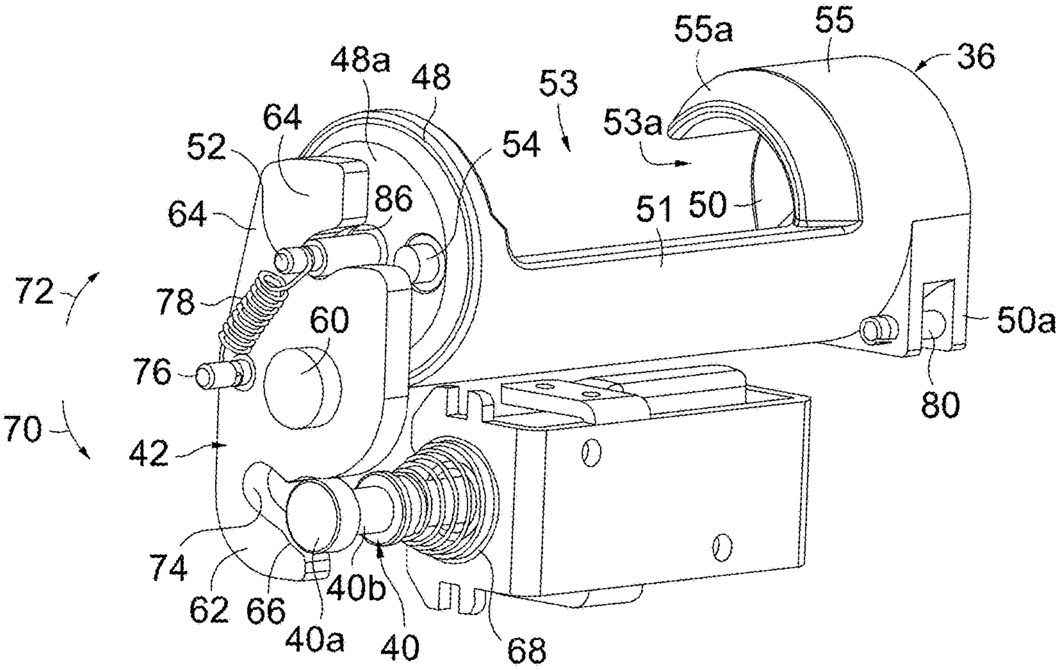
FIG. 8 is a right rear perspective view of the components shown in FIG. 7.
Figure 9:
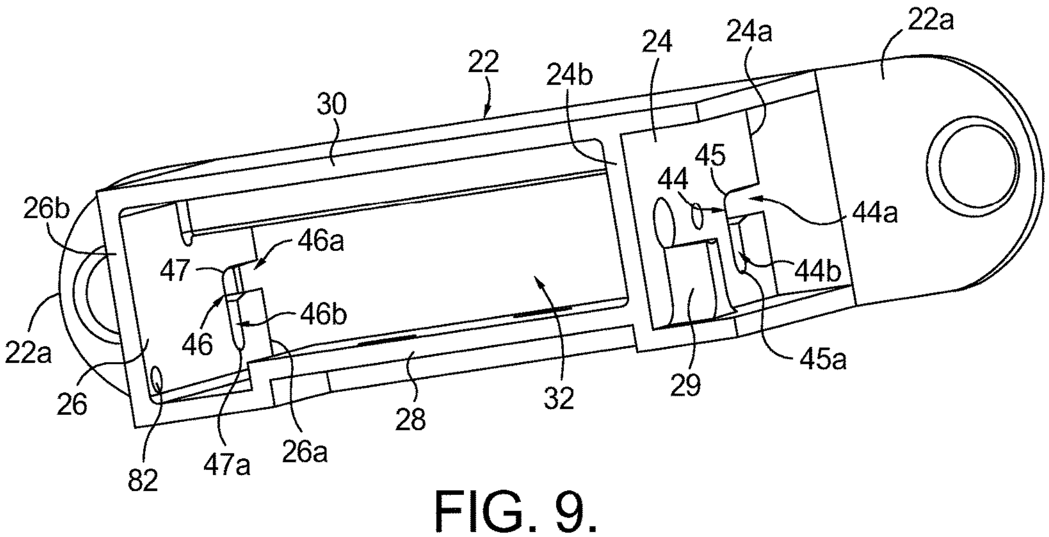
FIG. 9 is a rear perspective view of a housing of the electric strike shown in FIG. 2.
Figure 10:
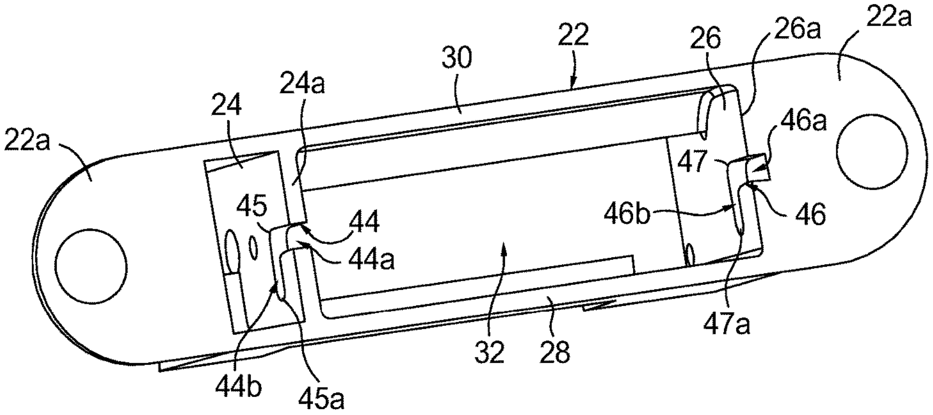
FIG. 10 is a front perspective view of the housing shown in FIG. 9.

Turning now to FIGS. 2-13, electric strike 20*c* includes a strike housing 22 having a top wall 24, bottom wall 26 and opposing side walls 28, 30 all defining a strike cavity 32. Strike housing 22 includes a pair of opposing mounting flanges 22*a* that may be used to mount electric strike 20*c* to door frame 14 along with a strike plate 34. Electric strike 20*c* further includes a keeper 36 that is disposed within strike cavity 32 and movable between a latched position and an unlatched position to selectively retain door latch 18 in strike cavity 32. For example, keeper 36 may be configured as a cylindrical keeper as seen in FIGS. 6-8. Electric strike 20*c* further comprises an actuating mechanism 38, such as, for example, a solenoid, that is mounted in strike cavity 32. Actuating mechanism 38 may include a plunger 40 that is operatively and selectively coupled with keeper 36 via a blocking member 42, as will be described in greater detail below.

Figure 11:
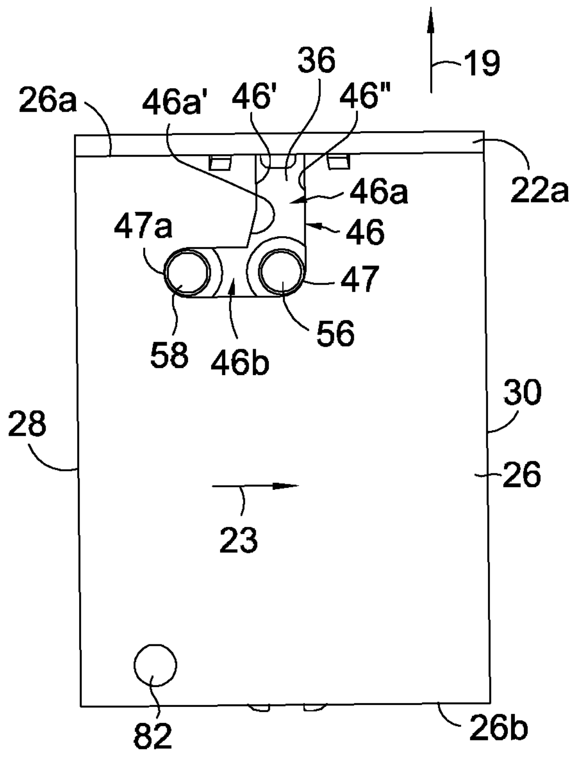
FIG. 11 is a left side view of the electric strike shown in FIG. 2.

As seen in FIGS. 9-11 and 13B, top wall 24 and bottom wall 26 of strike housing 22 each define a respective slot 44, 46 therein. Slots 44 and 46 are arranged within their respective walls 24, 26 and configured to allow keeper 36 to be supported by strike housing 22. For instance, slots 44, 46 may be mirror images of one another on opposite top and bottom walls 24, 26. In one exemplary embodiment of the present invention, and with specific reference to FIGS. 11 and 13B, each of slots 44, 46 may be generally L-shaped having respective inner and outer edges 44', 44" (FIG. 13) and 46', 46" (FIG. 11). A stem portion 44*a* of slot 44 generally extends from a top edge 24*a* of top wall 24 toward a bottom edge 24*b* of top wall 24, and a stem portion 46*a* of slot 46 generally extends from a top edge 26*a* of bottom wall 26 toward a bottom edge 26*b* of bottom wall 26 of strike housing 22. In one exemplary embodiment, stem portions 44*a*, 46*a* may be conterminous with and extend perpendicularly inwardly from a respective top edge 24*a*, 26*a* of respective top wall 24 and bottom wall 26. Further, a leg portion 44*b* of slot 44 may be oriented generally perpendicular to stem portion 44*a* and directed toward side wall 28 of strike housing 22, and a leg portion 46*b* of slot 46 may be oriented generally perpendicular to stem portion 46*a* and directed toward side wall 28 of strike housing 22. In one exemplary embodiment, leg portions 44*b*, 46*b* may be a spaced distance from, and generally parallel to, its respective top edge 24*a*, 26*a*. Outer edge 44" of stem portion 44*a* and leg portion 44*b* meet at a vertex 45, and outer edge 46" of stem portion 46*a* and leg portion 46*b* meet at a vertex 47. Leg portions 44*b*, 46*b* extend from their respective vertex 45, 47 to a respective terminal end 45*a*, 47*a* adjacent to side wall 28.

In one aspect, the lengths of stem portions 44*a*, 46*a* may be substantially equal to the lengths of leg portions 44*b*, 46*b* (wherein the term "substantially equal" shall mean to have less than 10% variance between measures). Further, inner edge 44' and outer edge 44" of leg portion 44*b* may be generally parallel with one another, and inner edge 46' and outer edge 46" of leg portion 46*b* may be generally parallel with one another. In regard to stem portion 44*a*, the portions of inner edge 44' and outer edge 44" extending from top edge 24*a* may be parallel with one another, and then transitioning to at least a portion where inner edge 44' and outer edge 44" are non-parallel with one another. Similarly, the portions of inner edge 44' and outer edge 44" of stem portion 46*a* extending from top edge 26*a* may be parallel with one another, and then transitioning to at least a portion where inner edge 44' and outer edge 44" are non-parallel with one another. For example, the portions of inner edges 44', 46' of stem portions 44*a*, 46*a* that may be non-parallel with respective outer edges 44", 46" of stem portions 44*a*, 46*a* may be accomplished by providing an angled, flared, or curved portion 44*a*', 46*a*' (hereafter a "flared portion") on respective inner edges 44', 46' so that inner edges 44', 46' move away from respective outer edges 44", 46" as the stem portions 44*a*, 46*a* extend toward their respective leg portions 44*b*, 46*b*. In other words, flared portions 44*a*', 46*a*' increase the angular transition between inner edge 44', 46' of stem portions 44*a*, 46*a* and leg portions 44*b*, 46*b* to assist in providing a smooth translation and rotation of keeper 36 between latched and unlatched positions by preventing pins 52, 54 and 56, 58 from being bound up in their respective slots 44, 46. It will be understood that keeper 36 may simultaneously translate and rotate between latched and unlatched positions, as will be described below.

As shown in FIGS. 7 and 8, keeper 36 includes a first end 48, a second end 50, and a keeper sidewall 51 extending therebetween so as to define a latch cavity 53 dimensioned to releasably receive door latch 18 therein. Keeper sidewall 51 may further include an extended sidewall portion 55 overlapping a portion of the latch cavity 53 to define a latch pocket 53*a* such that the door latch 18 is secured by the extended sidewall portion 55 when the latch hook 18*b* is received in latch pocket 53*a*. Extended sidewall portion 55 is configured to selectively rotate and translate with respect to strike housing 22 so as to allow door latch 18 to be withdrawn from cavity 53, as will be described in greater detail below.

Figure 13B:
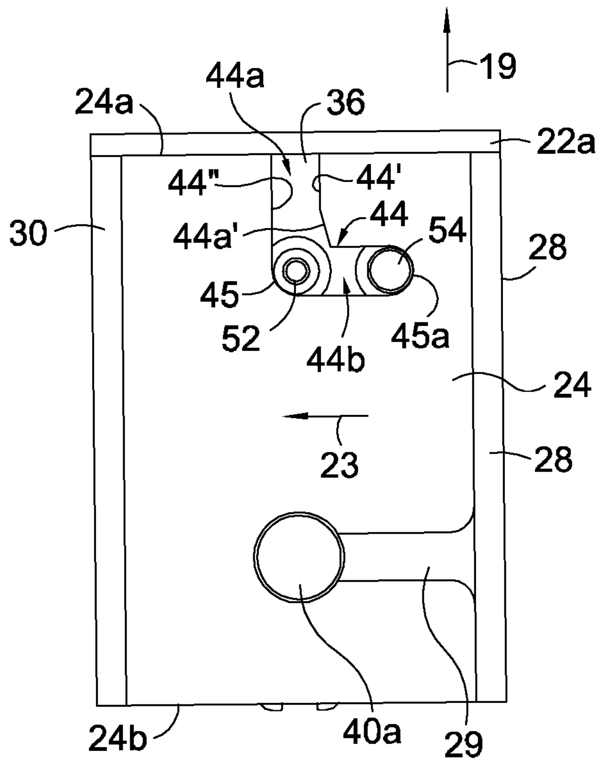
FIG. 13B is a view similar to FIG. 13A with the blocking member and associated spring removed.

As seen in FIGS. 7 and 8, each of first end 48 and second end 50 may further include respective outwardly extending first and second keeper pins 52, 54 and 56, 58. As seen in FIG. 13B, first and second keeper pins 52, 54 on first end 48 of keeper 36 may be slidably received within slot 44 defined in top wall 24 of strike housing 22. As seen in FIG. 11, first and second keeper pins 56, 58 of second end 50 of keeper 36 may be slidably received within slot 46 defined in bottom wall 26 of strike housing 22. With reference to FIG. 8, in one embodiment of the present invention, first keeper pin 52 may be dimensioned to have a length which extends beyond the thickness of top wall 24 so as to engage blocking member 42 while second keeper pin 54 is dimensioned so as not to engage or otherwise interfere with blocking member 42 while riding within slot 44. First and second keeper pins 56, 58 are also dimensioned so as not to inhibit rotation and translation of keeper 36 within housing 22. In a further aspect of this embodiment, first keeper pins 52, 56 may be located at or adjacent to their respective vertices 45, 47 while second keeper pins 54, 58 may be located at the terminal end 45*a*, 47*a* of their respective leg portion 44*b*, 46*b* when keeper 36 is in the latched position (FIG. 11).

With particular reference to FIGS. 5-8 and 12, blocking member 42 may be pivotally mounted to the external surface 24*c* of top wall 24 of housing 22 about an axis of rotation, such as via a pivot pin 60. In a locked mode, first portion 62 of blocking member 42 may be configured to selectively engage with plunger 40 of solenoid 38 while a second portion 64 may selectively engage first keeper pin 52 on first end 48 of keeper 36 so as to prevent or permit rotation of blocking member 42 and actuation (rotation and translation) of keeper 36, as will be discussed in greater detail below. Blocking member is in an unlocked mode when first portion 62 is not engaged with plunger 40.

Figure 12:
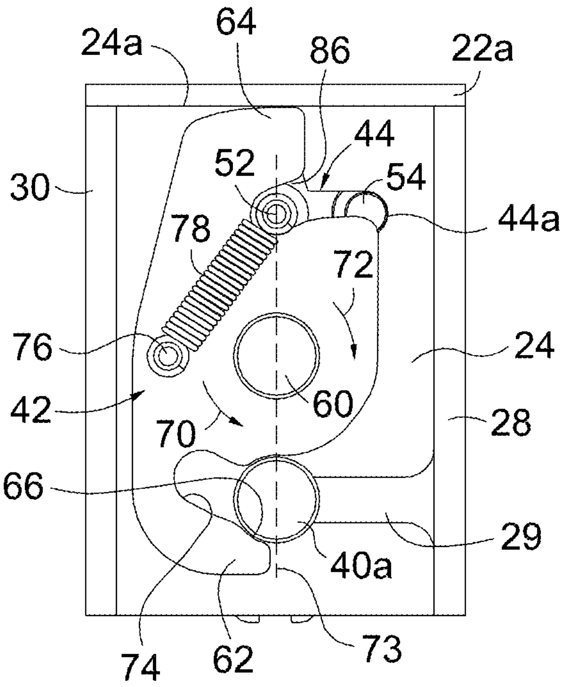
FIG. 12 is a right side view of the electric strike shown in FIG. 2 showing the blocking member in a locked mode.

As shown most clearly in FIGS. 8 and 12, first portion 62 may define a first indent 66 dimensioned to receive plunger head 40*a* therein. Engagement between first indent 66 and plunger head 40*a* prevents pivoting of blocking member 42 about the axis of pivot pin 60 and places blocking member 42 in the locked mode. In the locked mode, blocking member 42 prevents keeper 36 from moving from the latched to the unlatched position due to engagement of keeper pin 52 with second portion 64 of blocking member 42. When door latch 18 is in the latched condition, door 12 is closed and positioned within frame 14. In accordance with an aspect of the invention and with reference to FIG. 12, the alignment 73 of the axes (i.e., co-linear orientation) of keeper pin 52, pivot pin 60, and plunger head 40*a* stabilize blocking member 42 in the locked mode. For instance, if the door latch 18 is disposed in latch cavity 53 when keeper 32 is in the latched position (FIG. 14A) and an attempted is made to open the door 12 in direction 19, the force imposed on extended sidewall portion 55 of keeper 32 will be directed through the rotational axis 60 of blocking member 42 and plunger 40*a*, thereby eliminating a moment force that would put undue stress on keeper 32.

Further, side wall 28 of housing 22 may also include a plunger support wall 29 positioned adjacent plunger 40 so as to minimize or prevent lateral (side to side) bending movement of plunger 40 and its associated shaft, such as when latch 18 is violently pulled in an unauthorized attempt to cause locked keeper 36 to release door latch 18 from latch cavity 53. It should be understood that solenoid 38 may be operated in either a fail-safe mode or a fail-secure mode.

By way of example, when in fail-secure mode, plunger head 40*a* may engage first indent 66 to prevent actuation of keeper 36 when solenoid 38 is unpowered. Powering of solenoid 38 may then draw plunger 40 inward toward solenoid 38, while also causing potential energy to be stored within plunger spring 68. Inward draw of plunger 40 disengages plunger head 40*a* from first indent 66 places blocking member 42 in an unlocked mode and thereby allowing blocking member 42 to pivot in direction 70 (FIG. 12). Keeper 36 may then be moved to the unlocked position such that door latch 18 may be removed from latch cavity 53 of keeper 36 thereby allowing door 12 to be opened. Depowering of solenoid 38 allows plunger spring 68 to release the stored potential energy and return plunger head 40*a* to first indent 66 when blocking member 42 reverse pivots in direction 72. Keeper 36 will then return to its locked position.

Alternatively, when in fail-safe mode, blocking member 42 is in an unlocked mode so that keeper 36 is permitted to move to its unlocked position to allow door latch 18 to be removed from latch cavity 53 of keeper 36. In order to place blocking member 42 in the unlocked mode, plunger 40 is positioned such that plunger shaft 40*b* passes through first indent 66 and extends outwardly beyond blocking member 42. In order to allow for this arrangement, plunger shaft 40*b* has a diameter that is smaller than the diameter of plunger head 40*a* such that a second indent 74 defined within first portion 62 of blocking member 42 is configured to allow plunger shaft 40*b* to pass therein. Blocking member 42 may then pivot in direction 70 such that plunger shaft 40*b* is received within second indent 74. Keeper 36 may then be moved to the unlocked position to allow withdrawal of door latch 18 from latch cavity 53 and opening of door 12. Powering of solenoid 38 may draw plunger 40 inward toward solenoid 38 until plunger head 40*a* is received within and interferes with first indent 66, as seen in FIG. 12, while also causing potential energy to be stored within plunger spring 68. Plunger head 40*a* is configured so that it will not fit within second indent 74. As such, plunger head 40*a* places blocking member 42 in the locked mode by preventing blocking member 42 from pivoting about pivot pin 60, allowing keeper pin 52 to be disposed within the slot defined in second portion 64 of blocking member 42 thereby securing door latch 18 within latch cavity 53 of keeper 36 and locking door 12 within frame 14 as described above. Depowering of solenoid 38 releases the stored energy within solenoid spring 68 so as to re-extend plunger shaft 40*b* whereby plunger shaft 40*b* may travel through first indent 66 and into second indent 74. Blocking member 42 may then again pivot such that keeper 36 is permitted to move to its unlocked position so that door latch 18 may be withdrawn from latch cavity 53 to open door 12.

With additional reference to FIG. 5, blocking member 42 may further carry a spring post 76 thereon. A first extension spring 78 may then be mounted between spring post 76 and first keeper pin 52 to bias keeper 36 toward the latched position. Second end 50 of keeper 36 may also include a keeper extension 50*a* configured to mount a roll pin 80 thereto (FIG. 8) while housing 22 may include a second spring post 82 (FIG. 5). A second extension spring 84 may then be mounted to roll pin 80 and second spring post 82 to further aid in biasing keeper 36 to the latched position and prevent twisting or tilting of keeper 36 within strike cavity 32. As shown most clearly in FIGS. 6 and 8, first end 48 of keeper 36 may also include a TEFLON disc 48*a* which further assists in preventing twisting or tilting of keeper 36 by taking up space between blocking member 42 and first end 48 of keeper 36, while also reducing friction between first end 48 and top wall 24 of strike housing 22.

Again with reference to FIGS. 8 and 12, second portion 64 of blocking member 42 defines a keeper pin channel 86 configured to receive first keeper pin 52 therein when keeper 36 is in the latched position and blocking member 42 is in the blocking position. As will be described in more detail below, keeper pin channel 86 may selectively inhibit translation of first keeper pin 52 thereby selectively retaining door latch 18 within keeper cavity 53.

Figure 13A:
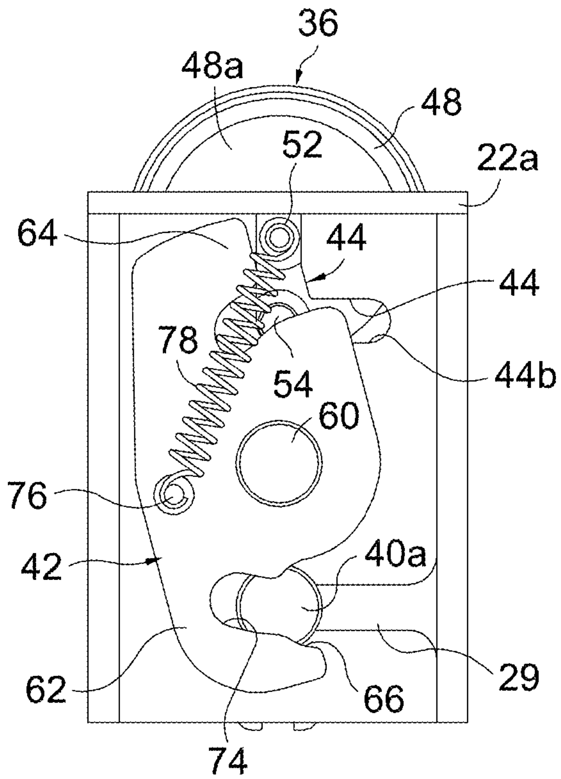
FIG. 13A is a view similar to FIG. 12 showing the blocking member in an unlocked mode.
Figure 14A:
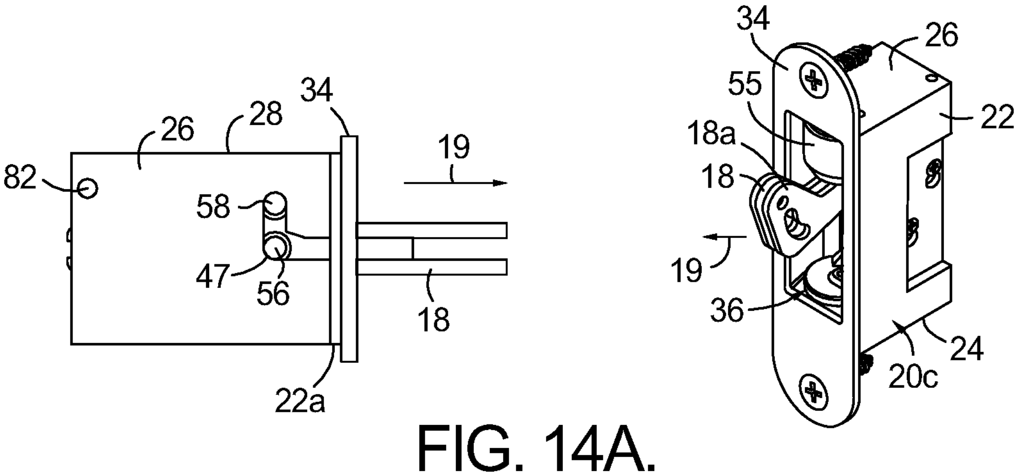
FIGS. 14A-14E illustrate a sequence of drawings showing the operation of the electric strike to release a door latch from a door frame to allow the sliding door to move to an opened position.

Turning now to FIGS. 14A-14E, an exemplary actuation of keeper 36 from the latched position to the unlatched position to release door latch 18 is generally shown. Initially, as seen in FIG. 8, blocking member 42 is positioned in the blocking position with first keeper pin 52 received within keeper pin channel 86. When keeper 36 is in the latched position shown in FIGS. 11, 12, 13B and 14A, first keeper pins 52, 56 may be positioned adjacent respective vertices 45, 47 while second keeper pins 54, 58 are adjacent respective terminal ends 45*a*, 47*a*. With plunger head 40*a* in a non-engaged position with first indent 66 within first end 62 of blocking member 42 (e.g., withdrawn by powering plunger 38 when in fail-secure mode, or with plunger shaft 40*b* received within first indent 66 when in fail-safe mode) as seen in FIG. 13A, sliding of door 12 toward the open orientation (in direction 19 as shown in FIGS. 1 and 14A), such as by pulling of door handle 16, causes hook portion 18*b* of door latch 18 to impact and drive against an inner surface of extended sidewall portion 55 of keeper 36.

Figure 14B:
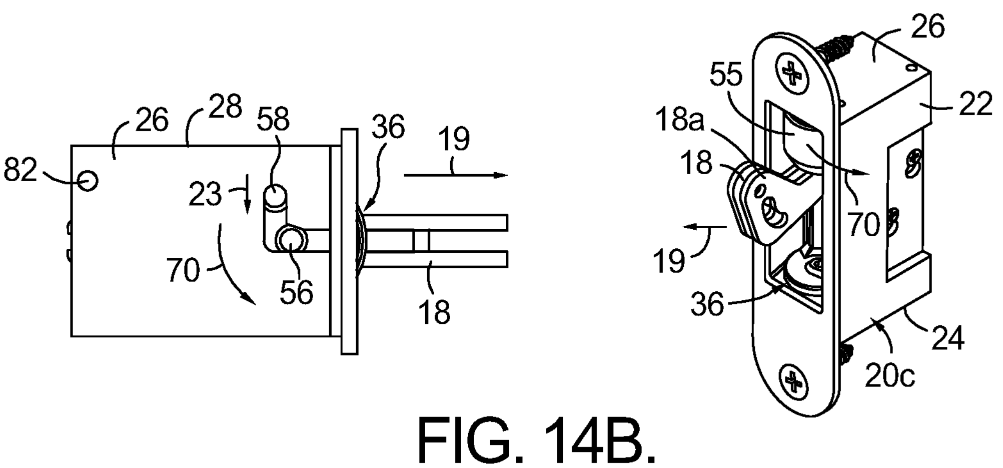
Figure 14C:
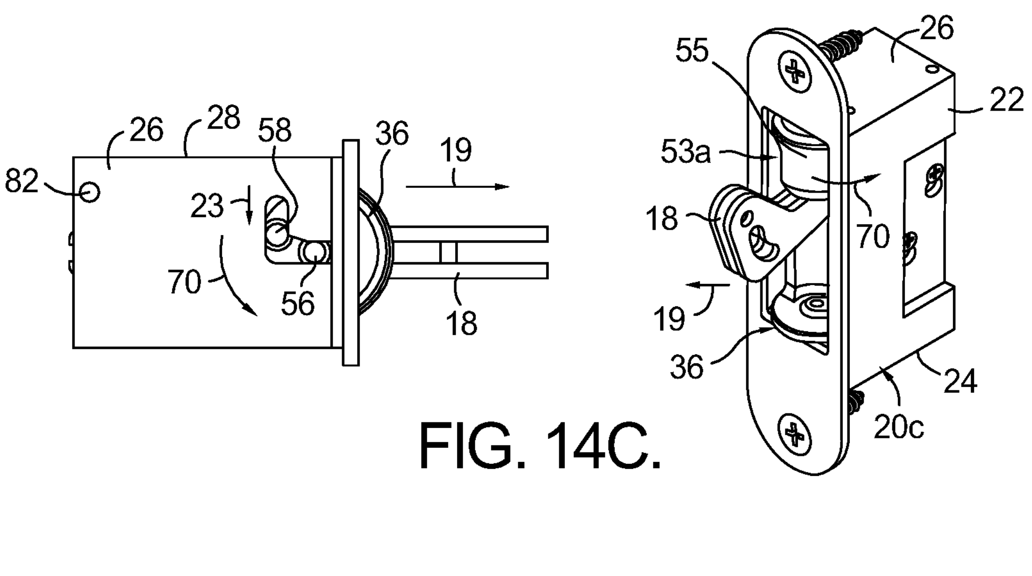

As generally shown in FIGS. 11, 13B and 14B, imposing a force on door latch 18 in direction 19 causes keeper 36 to rotate relative to strike housing 22 and translate outwardly of strike cavity 32 as first keeper pins 52, 56 travel toward top edges 24*a*, 26*a* within their respective stem portion 44*a*, 46*a* of slots 44, 46. Continued withdrawal of door latch 18 from strike cavity 32 is briefly inhibited by engagement of second keeper pins 54, 58 with inner edge 44', 46' defining their respective leg portion 44*b*, 46*b*. However, further pulling of door latch 18 in direction 19 may cause first keeper pins 52, 56 to further translate toward top edge 24*a*, 26*a* within stem portions 44*a*, 46*a* in direction 19 while second keeper pins 54, 58 translate within leg portions 44*b*, 46*b* in direction 23 which is generally perpendicular to direction 19. As seen in FIG. 14C, first and second keeper pins 52, 54, 56, 58 continue to move in slots 44, 46 which results in the continued translation of keeper 36 relative to strike cavity 32 while also causing rotation of keeper 36 in direction 70 so as to begin disengaging extended sidewall portion 55 from hook portion 18*b* of door latch 18. In one embodiment, it will be understood that keeper 36 may translate between about 1 degree and about 180 degrees, for example.

Figure 14D:
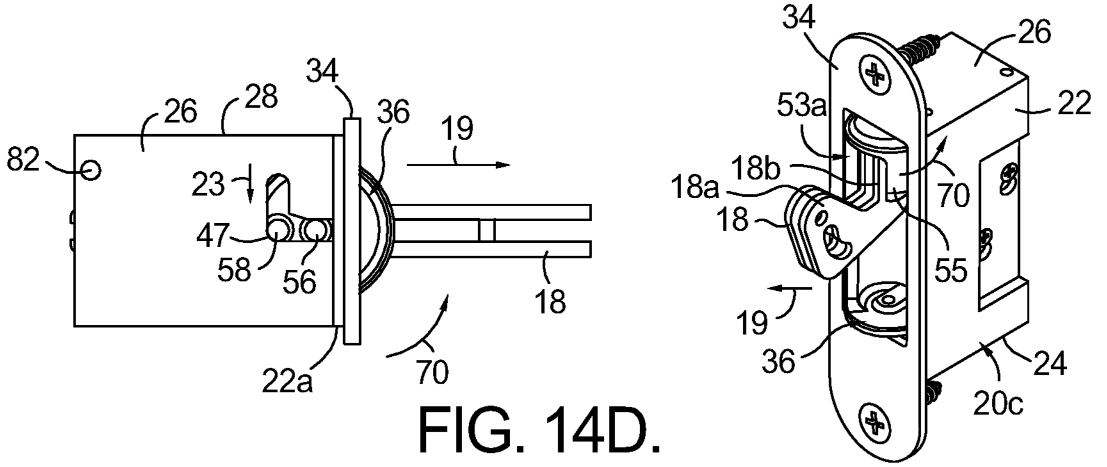
Figure 14E:
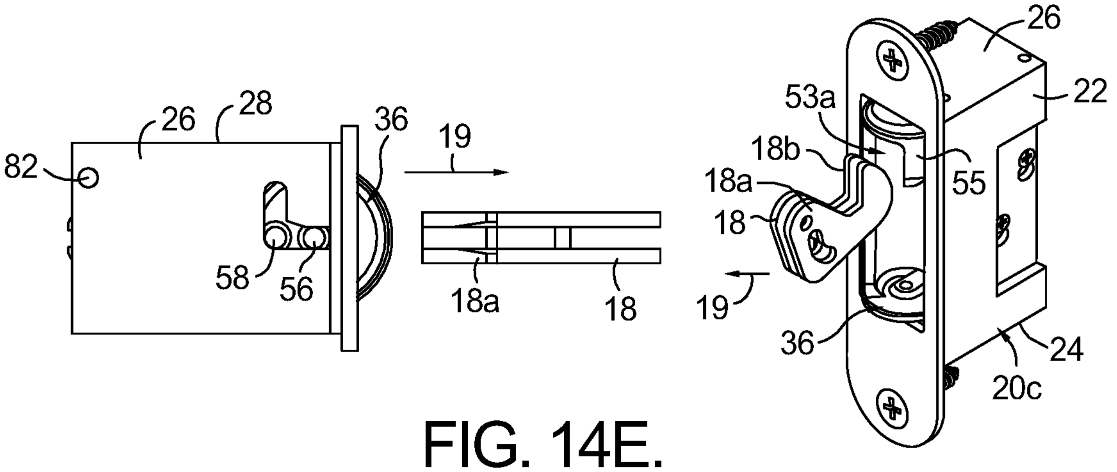

As generally shown in FIGS. 14D and 14E, door latch 18 is permitted to move in direction 19 when keeper 36 is rotated to that the point where the notch formed in extended sidewall portion 55 is lined up with hook portion 18*b* of door latch 18. In one exemplary embodiment, the lengths of stem portions 44*a*, 46*a* and leg portions 44*b*, 46*b* are dimensioned such that first keeper pins 52, 56 travel substantially the entire length of stem portions 44*a*, 46*a* so as to engage or nearly engage cover plate 34, while second keeper pins 54, 58 travel substantially the entire length of leg portions 44*b*, 46*b* until engaging or nearly engaging outer edge 44", 46" at or near respective vertices 45, 47.

As described above, once hook portion 18*b* clears extended sidewall portion 55, door latch 18 is no longer applying an opening force on keeper 36. Removal of the opening force allows first and second extension springs 78, 84 to release their stored potential energy to thereby retract keeper 36 into strike cavity 32 through a reverse linear and rotational translation of keeper 36. Keeper 36 is thus rotated such that extended sidewall portion 55 occludes pocket 53*a* to place keeper 36 in the latched position as seen in FIG. 15A.

Figure 15A:
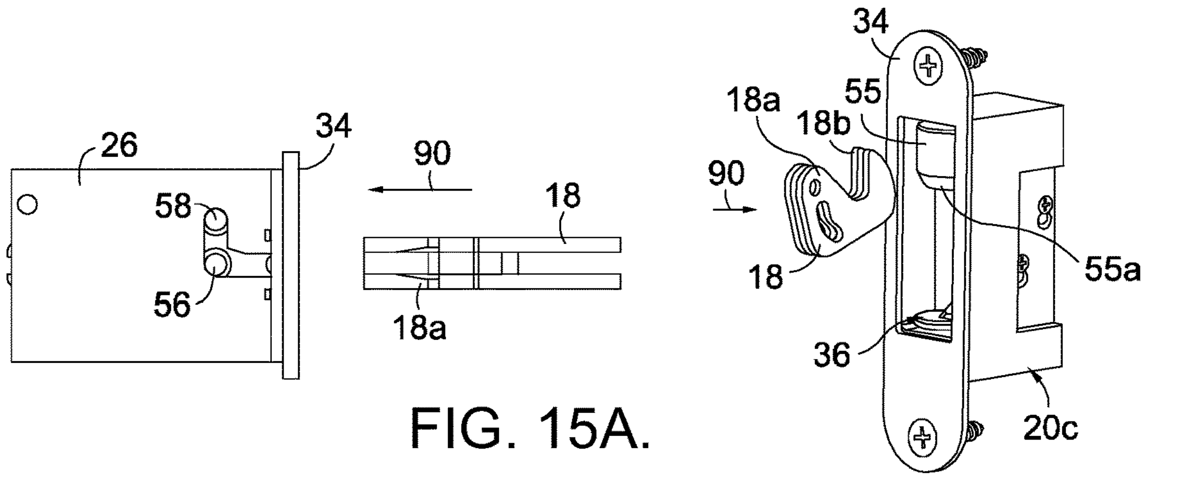
FIGS. 15A-15C illustrate a sequence of drawings showing the door latch engaging with the electric strike as the sliding door is being moved toward a closed state to place the sliding door in a locked state relative to a door frame.
Figure 15B:
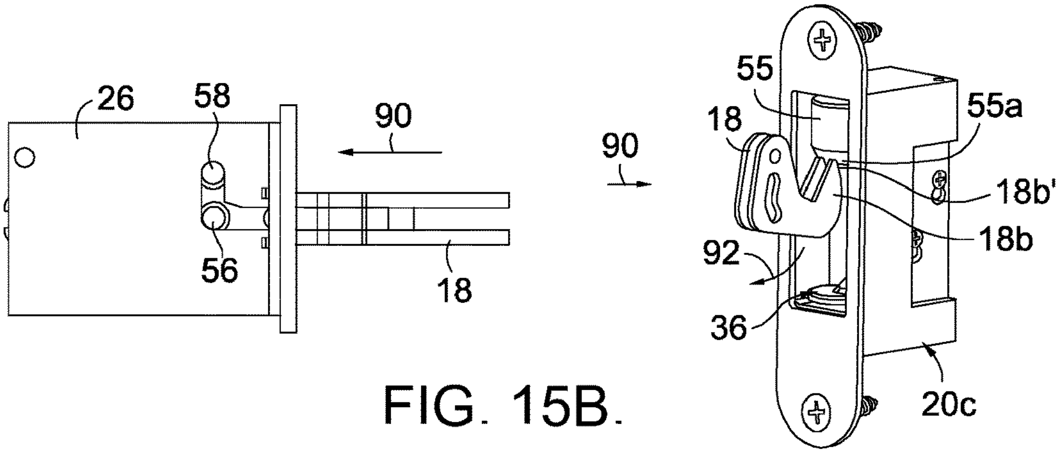
Figure 15C:
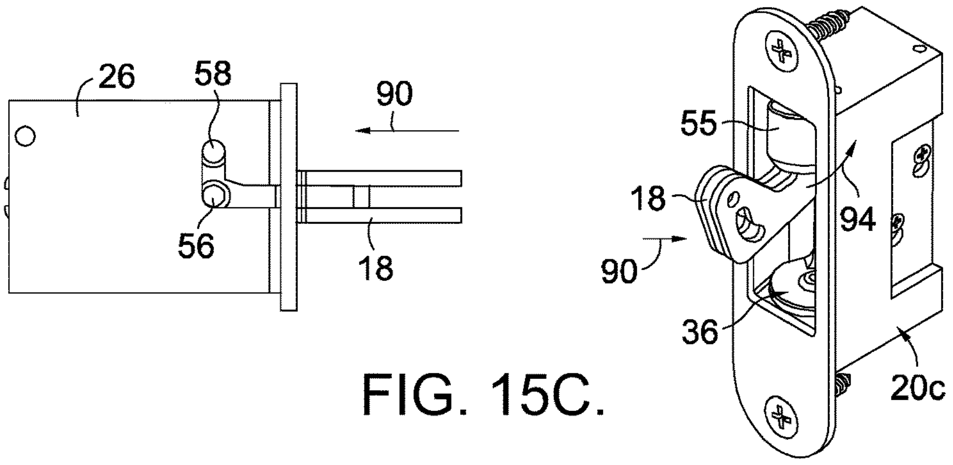

With reference to FIGS. 15A-15C, in order to close sliding door 12 a force is imposed on door 12 in direction 90 so that door latch 18 engages keeper 36. When door latch 18 engages keeper 36, a curved outer edge 18*b*' of hook portion 18*b* comes into contact with extended sidewall portion 55 of keeper 36 as seen in FIG. 15B. With application of sufficient impact force, hook portion 18*b* is redirected downwardly to clear an edge of sidewall portion 55. To assist downward redirection, extended sidewall portion 55 may include a chamfered face 55*a* which is configured to engage curved outer edge 18*b*' of door latch 18 to cause door latch 18 to travel downward within strike housing 22 while also rotating in direction 92. With continued impact force applied to door 12, door latch 18 continues to travel in direction 90 and rotation in direction 92 until such time that hook portion 18*b* of door latch 18 clears the edge of extended sidewall portion 55 of keeper 36. Door latch 18 is then biased to rotate in direction 94 such that hook portion 18*b* resides within pocket 53*a* as seen in FIG. 15C. Door latch 18 is then secured within latch pocket 53*a* of keeper 36 with door 12 in the closed position within frame 14.

Turning now to FIGS. 17A-19B, an exemplary embodiment of an alternative electric strike 120 includes a strike housing 122 having a top wall 124, bottom wall 126 and opposing side walls 128, 130 all defining a strike cavity 132 similar to electric strike 20*c* described above. Strike housing 122 includes a pair of opposing mounting flanges 122*a* that may be used to mount electric strike 120 to door frame 14 along with strike plate 34. Electric strike 120 further includes a keeper 36 that is disposed within strike cavity 132 and is movable between a latched position and an unlatched position to selectively retain a door latch (e.g., door latch 18) in strike cavity 132. Electric strike 120 may further comprise actuating mechanism 38, such as, for example, a solenoid, that is mounted in strike cavity 132. As described above with regard to electric strike 20*c*, actuating mechanism 38 may include a plunger 40 that is operatively and selectively coupled with keeper 36 via a blocking member 42. The operation of actuating mechanism 38 has been described in greater detail above with regard to electric strike 20*c* and FIGS. 5-13B.

Figure 18A:
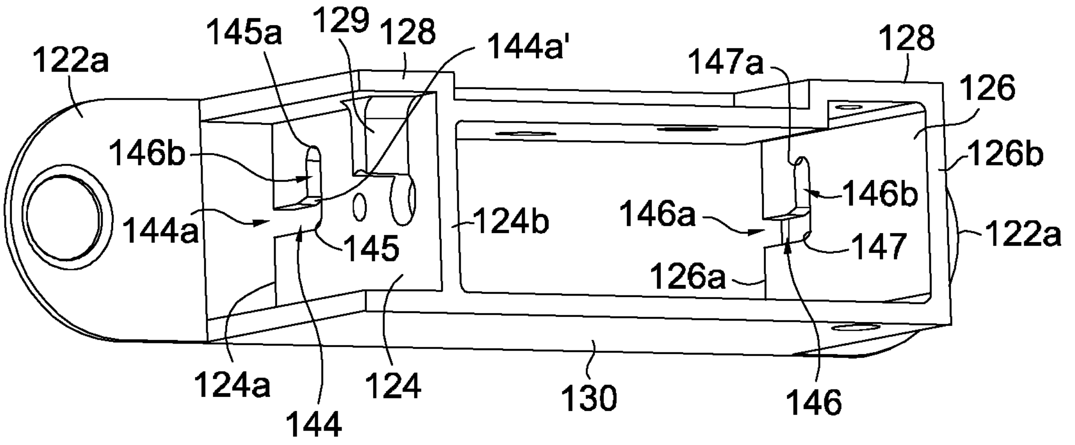
FIG. 18A is a bottom perspective view of a strike housing included in the electric strike shown in FIG. 17A.

As seen in FIGS. 18A, top wall 124 and bottom wall 126 of strike housing 122 each define a respective slot 144, 146 therein which are analogous to slots 44 and 46 described above with regard to housing 22 of electric strike 20*c*. Slots 144 and 146 are arranged within their respective walls 124, 126 and are configured to allow keeper 36 to be supported by strike housing 122. For instance, slots 144, 146 may be mirror images of one another on opposite top and bottom walls 124, 126. In one exemplary embodiment of the present invention, and with specific reference to FIG. 18A, each of slots 144, 146 may be generally L-shaped wherein a stem portion 144*a* of slot 144 generally extends from a top edge 124*a* of top wall 124 toward a bottom edge 124*b* of top wall 124, and a stem portion 146*a* of slot 146 generally extends from a top edge 126*a* of bottom wall 126 toward a bottom edge 126*b* of bottom wall 126 of strike housing 122.

In one exemplary embodiment, stem portions 144*a*, 146*a* may be conterminous with and extend perpendicularly inwardly from a respective top edge 124*a*, 126*a* of respective top wall 124 and bottom wall 126. Further, a leg portion 144*b* of slot 144 may be oriented generally perpendicular to stem portion 144*a* and directed toward side wall 128 of strike housing 122, and a leg portion 146*b* of slot 146 may be oriented generally perpendicular to stem portion 146*a* and directed toward side wall 128 of strike housing 122. In one exemplary embodiment, leg portions 144*b*, 146*b* may be a spaced distance from, and generally parallel to, its respective top edge 124*a*, 126*a*. Leg portions 144*b*, 146*b* extend from their respective vertex 145, 147 to a respective terminal end 145*a*, 147*a* adjacent to side wall 128.

Stem portions 144*a*, 146*a* may also include respective flared portions 144*a*', 146*a*' which increase the angular transition between stem portions 144*a*, 146*a* and leg portions 144*b*, 146*b* to assist in providing a smooth translation and rotation of keeper 36 between latched and unlatched positions by preventing pins 52, 54 and 56, 58 from being bound up in their respective slots 144, 146, as described above with regard to flared portions 44*a*', 46*a*' of housing 22. Similar to electric strike 20*c* described in FIG. 5, blocking member 42 may further carry a spring post 76 thereon. A first extension spring 78 may then be mounted between spring post 76 and first keeper pin 52 to bias keeper 36 toward the latched position. However, where electric strike 20*c* includes roll pin 80 (FIG. 8) on second end 50 of keeper 36 and housing 22 includes a second spring post 82 (FIG. 5) for mounting second extension spring 84 therebetween, electric strike 120 instead includes a biasing assembly 180 which will be described in more detail below.

Figure 18B:
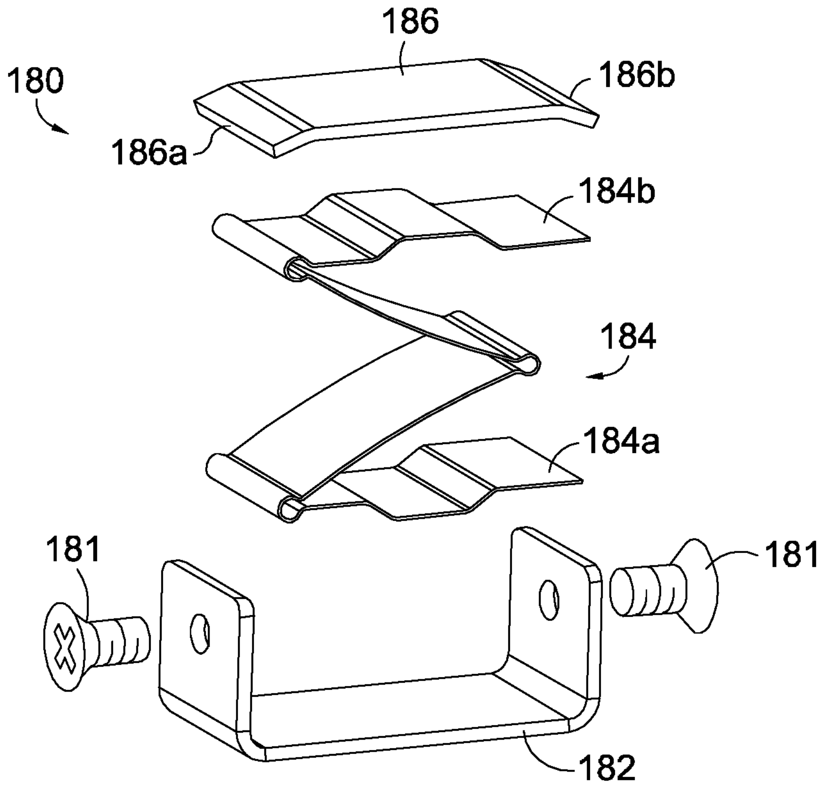
FIG. 18B is an exploded view of an exemplary embodiment of a biasing assembly configured for use within the electric strike shown in FIG. 17A.

As seen in FIGS. 17A-19B and most clearly within FIG. 18B, biasing assembly 180 may include a mounting bracket 182 configured to be secured to opposing side walls 128, 130 of housing 122, such as via a respective fastener, such as screws 181. It should be noted that mounting bracket 182 may be secured to strike housing 122 through any suitable fastener, such as a weld, rivet, bolt, or similar attachment mechanism. In an alternative embodiment, mounting bracket may be unitarily or integrally formed on strike housing 122 so as to avoid the need for fasteners 181. Seated against mounting bracket 182 is a first end 184*a* of a spring 184. An opposing second end 184*b* of spring 184 may then be coupled to keeper 36 proximate second end 50, such as via engagement with a keeper engagement plate 186 mounted against keeper extension 50*a* (see also FIGS. 7 and 8). Keeper engagement plate 186 may further include angled ends 186*a*, 186*b* to assist movement of keeper extension 50*a* when keeper 36 rotates within housing 122 as will be discussed in greater detail below. Spring 184 may be any suitable biasing member including, but not limited to, a compression spring such as a magazine spring, coil spring, barrel spring, hourglass or conical spring, a wave spring, leaf spring, flat spring, spring clip or opposing magnets.

Figure 19A:
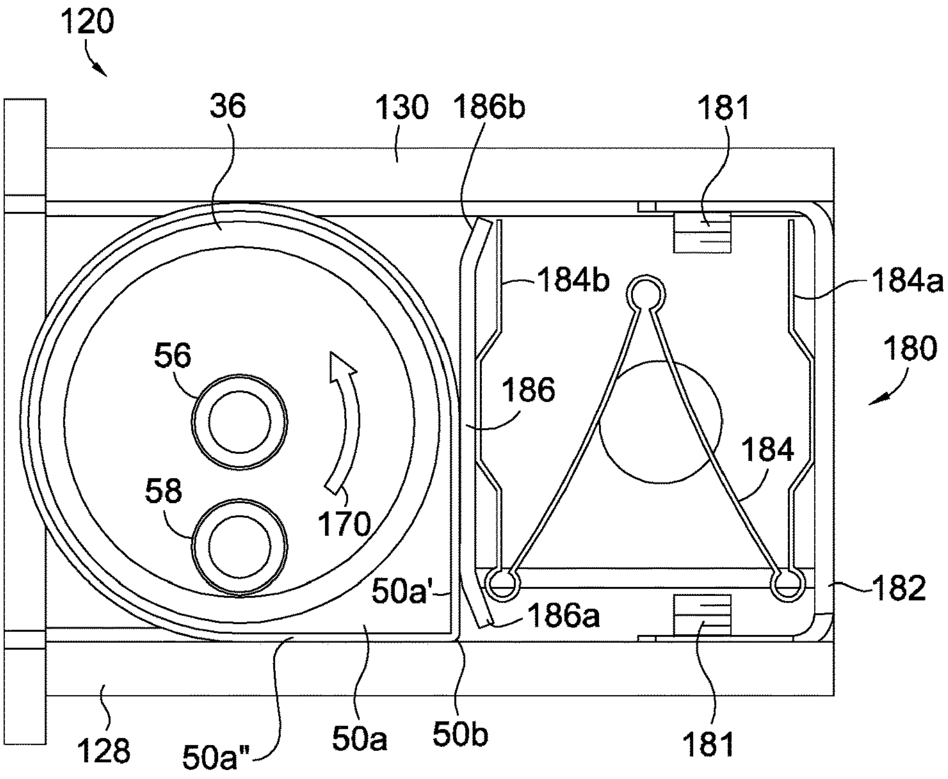
FIG. 19A is a cross-sectional view taken along line 19A-19A in FIG. 17B showing the biasing assembly with the keeper in the latched position.
Figure 19B:
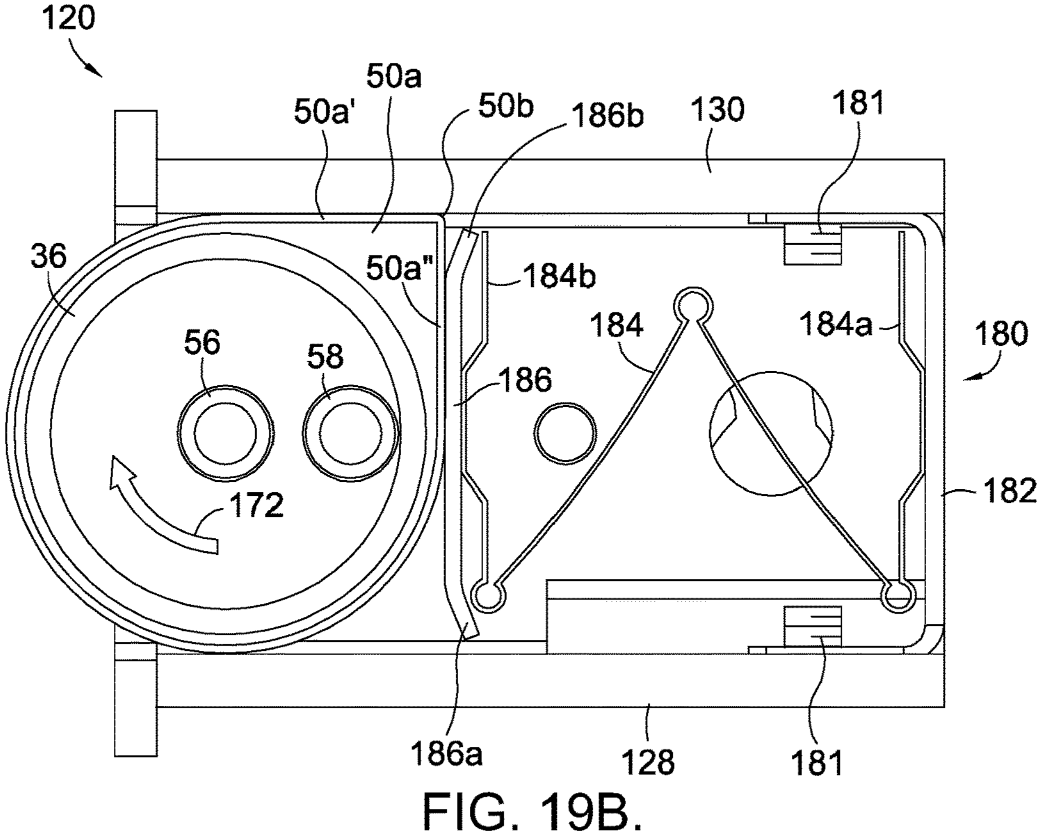
FIG. 19B is a cross-sectional view similar to FIG. 19A showing the biasing assembly with the keeper in the unlatched position.

With reference to FIGS. 19A-19B, an exemplary actuation of keeper 36 from the latched position (FIG. 19A) to the unlatched position (FIG. 19B) to release door latch 18 is generally shown. Initially, as seen in FIG. 19A, keeper 36 is constrained within housing 122 by blocking member 42 positioned in the blocking position with first keeper pin 52 received within keeper pin channel 86 similar to that described above with regard to FIGS. 11, 12, 13B and 14A. That is, first keeper pins 52, 56 are positioned adjacent respective vertices 145, 147 while second keeper pins 54, 58 are adjacent respective terminal ends 145*a*, 147*a* (not shown in FIGS. 19A and 19B). Keeper extension 50*a* of second end 50 of keeper 36 engages keeper engagement plate 186 so as to direct keeper engagement plate inwardly within housing 122 toward mounting bracket 182. Potential energy is stored within spring 184 via compression of the spring 184, or in an alternative embodiment by a repelling force generated by opposing magnets.

With movement of plunger head 40*a* to a non-engaged position (see e.g., FIG. 13A), the potential energy stored within spring 184 may be released, thereby causing keeper 36 to rotate relative to strike housing 122 and translate outwardly of strike cavity 132. As described above with regard to FIGS. 14A-14E, first keeper pins 52, 56 travel toward top edges 124*a*, 126*a* within their respective stem portion 144*a*, 146*a* of slots 144, 146 in direction 19 while second keeper pins 54, 58 translate within leg portions 144*b*, 146*b* in direction 23 which is generally perpendicular to direction 19. Movement of first and second keeper pins 52, 54, 56, 58 in slots 144, 146 results in the rotation of keeper 36 in direction 70 so as to disengage extended sidewall portion 55 from hook portion 18*b* of door latch 18. Door 12 may then be opened within door frame 14 (see FIG. 1).

In contrast to electric strike 20*c* described above wherein removal of the opening force exerted by door latch 18 allows first and second extension springs 78, 84 to release their stored potential energy to thereby retract keeper 36 into strike cavity 32 through a reverse linear and rotational translation of keeper 36 such that extended sidewall portion 55 occludes pocket 53*a* to place keeper 36 in the latched position (see FIG. 15A), electric strike 120 may be configured to maintain keeper 36 in the unlatched position when not engaged with a door latch 18 similar to that shown in FIG. 14E. In one embodiment, the spring constant of compression spring 184 is selected to be greater than the spring constant of first extension spring 78 such that keeper 36 is biased to the unlatched position in the absence of any additional forces or constraints.

Thus, in order to close sliding door 12 a force is imposed on door 12 so that door latch 18 passes into latch cavity 53 defined by keeper 36. In one embodiment, electric strike 120 is configured for use with a door having a fixed (i.e., non-pivotable) hooked door latch similar to pivotal door latch 18 shown in FIGS. 14A-15C. Door latch 18 passes into latch cavity 53 until the latch engages keeper sidewall 51. With application of sufficient impact force against keeper sidewall 51 by door latch 18, keeper 36 is moved toward its latched position. Compression spring 184 becomes compressed by the imposed door closing force.

As keeper 36 moves towards its latched position, keeper 36 travels inwardly within housing 122 while also rotating as pins 52, 54, 56, 58 travel within their respective slots 144, 146 such that first keeper extension face 50*a*' moves from keeper engagement plate 186 to side wall 130 and second keeper extension face 50*a*" moves from side wall 128 to engage keeper engagement plate 186. Angled end 186*a* of keeper engagement plate 186 eases rotation of keeper 36 and keeper extension 50*a* by providing clearance for keeper extension vertex 50*b* when keeper 36 moves from the latched position (FIG. 19A) to unlatched position (FIG.

19B) generally in the direction of arrow 170 while angled end 186*b* provides clearance for keeper extension vertex 50*b* during movement of keeper 36 from the unlatched position to the latched position generally in the direction of arrow 172.

Keeper 36 continues to rotate until extended sidewall portion 55 occludes the hook portion of door latch 18 within keeper pocket 53*a*. Extension spring 78 may also release its stored potential energy to return blocking member 42 to its locked position (e.g., FIG. 8) while actuating mechanism 38 places plunger head 40*a* within first indent 66 to lock the latch within keeper 36 with door 12 in the closed position within frame 14.

Turning now to FIGS. 20A-22B, another exemplary embodiment of an alternative electric strike 220 includes a strike housing 222 having a top wall 224, bottom wall 226 and opposing side walls 228, 230 all defining a strike cavity 232 similar to electric strike 20*c* described above. Strike housing 222 includes a pair of opposing mounting flanges 222*a* that may be used to mount electric strike 220 to door frame 14 along with strike plate 34. Electric strike 220 further includes a keeper 236 that is disposed within strike cavity 232 and is movable between a latched position and an unlatched position to selectively retain a door latch (e.g., door latch 18) in strike cavity 232. Electric strike 220 may further comprise actuating mechanism 38, such as, for example, a solenoid, that is mounted in strike cavity 232. As described above with regard to electric strike 20*c*, actuating mechanism 38 may include plunger 40 that is operatively and selectively coupled with keeper 236 via blocking member 42. The operation of actuating mechanism 38 has been described in greater detail above with regard to electric strike 20*c* and FIGS. 5-13B, and will not be reproduced here for sake of brevity.

Figure 21A:
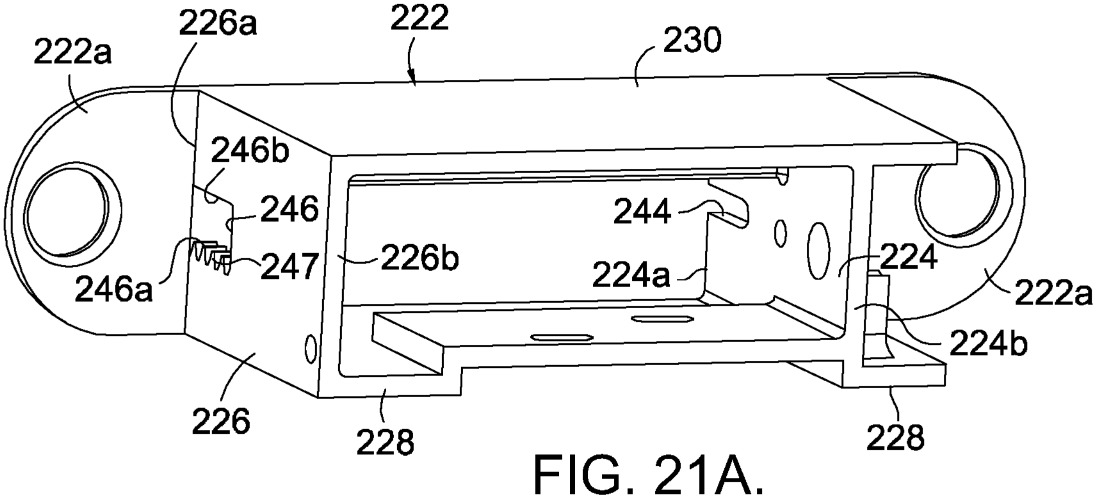
FIG. 21A is a bottom perspective view of a strike housing included in the electric strike shown in FIG. 20A.

As seen most clearly in FIG. 21A, top wall 224 and bottom wall 226 of strike housing 222 each define a respective slot 244, 246. Slots 244 and 246 are arranged within their respective walls 224, 226 and are configured to allow keeper 236 to be supported by strike housing 222. In one exemplary embodiment of the present invention, slot 244 defined within wall 224 of housing 222 may be a generally straight linear channel extending from a top edge 224*a* of top wall 224 toward a bottom edge 224*b* of top wall 224 of strike housing 222. Opposing slot 246 may be a generally rectangular-shaped channel extending from a top edge 226*a* of bottom wall 226 toward a bottom edge 226*b* of bottom wall 226. At least one of vertical channel wall 246*a*, 246*b* of slot 246 is configured to define a plurality of teeth 247 along at least a portion thereof (e.g., channel wall 246*a* as shown in FIG. 21A).

Figure 21B:
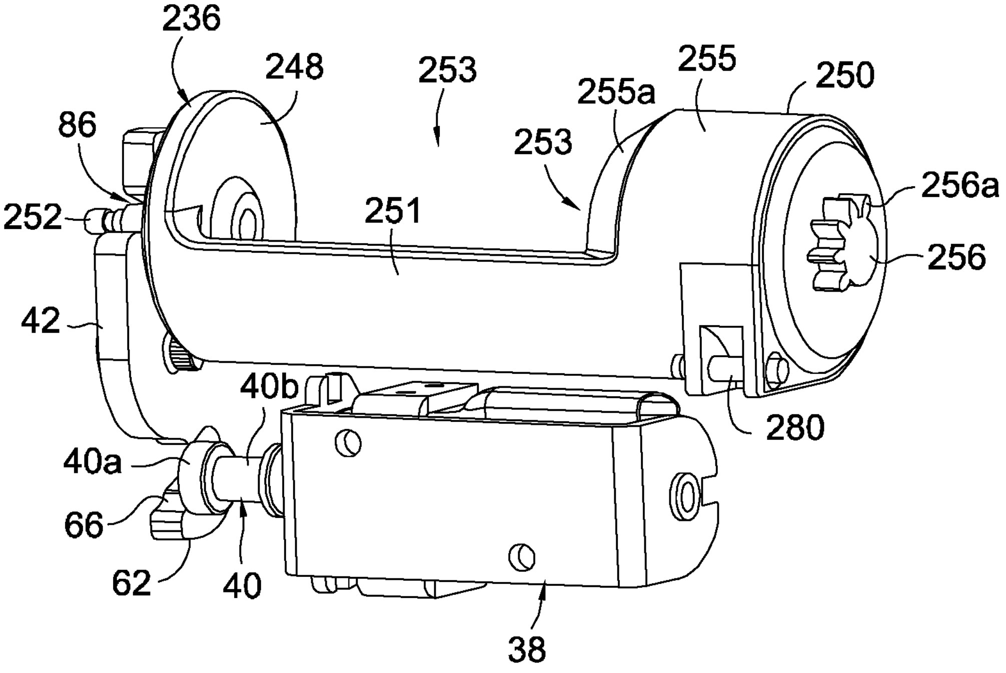
FIG. 21B is a perspective view of an exemplary embodiment of a keeper and actuating mechanism configured for use within the electric strike shown in FIG. 20A.

As shown in FIG. 21B, keeper 236 includes a first end 248, a second end 250, and a keeper sidewall 251 extending therebetween so as to define a latch cavity 253 dimensioned to releasably receive door latch 18 therein. Keeper sidewall 251 may further include an extended sidewall portion 255 overlapping a portion of the latch cavity 253 to define a latch pocket 253*a* such that door latch 18 is secured by extended sidewall portion 255 when latch hook 18*b* is received in the latch pocket as described above with regard to keeper 36. Extended sidewall portion 255 is configured to selectively rotate and linearly translate with respect to strike housing 222 so as to allow door latch 18 to be withdrawn from cavity 253, as will be described in greater detail below.

Figure 20A:
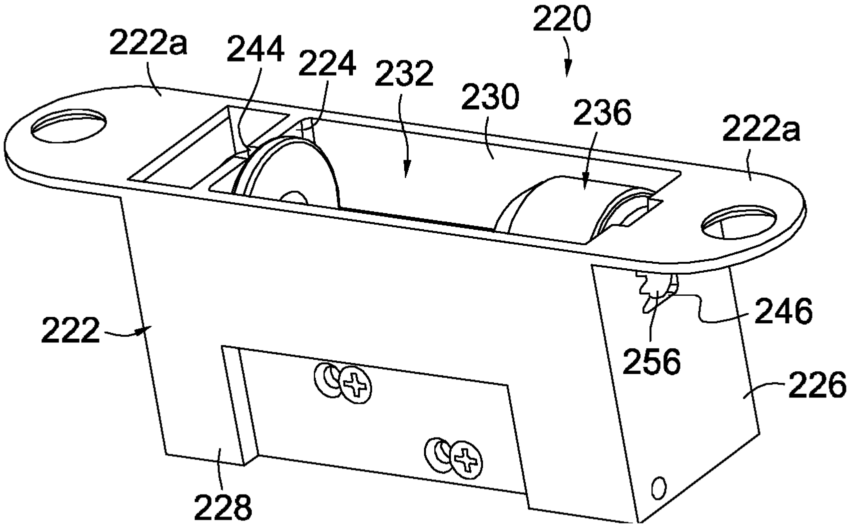
FIG. 20A is a top perspective view of another alternative embodiment of an electric strike in accordance with the present invention.
Figure 20B:
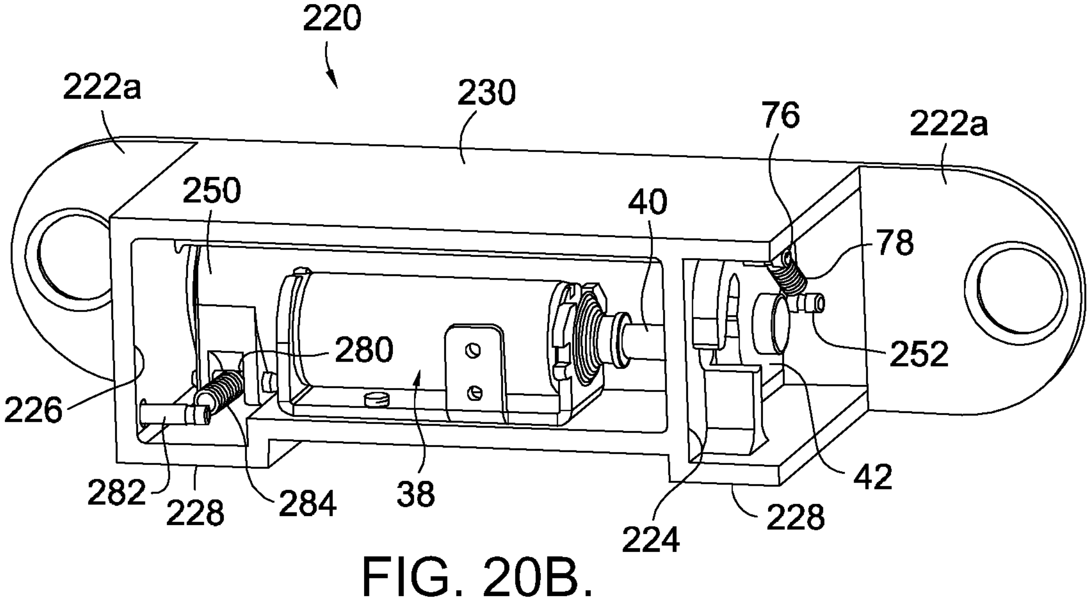
FIG. 20B is a bottom perspective view of the electric strike shown in FIG. 20A.
Figure 22A:
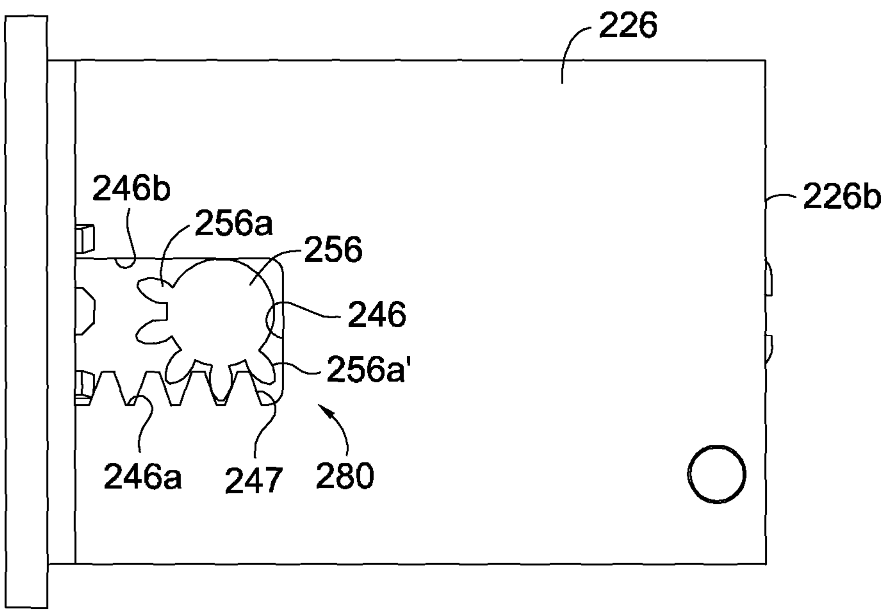
FIG. 22A is a side view of the electric strike shown in FIG. 20A with the keeper in the latched position.
Figure 22B:
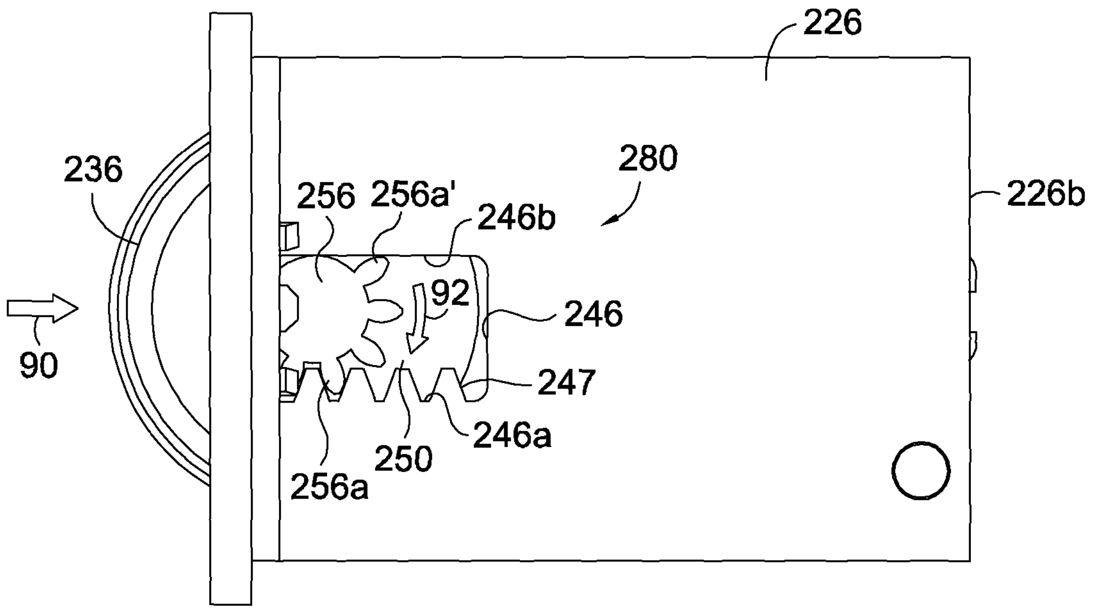
FIG. 22B is a side view of the electric strike shown in FIG. 20A with the keeper in the unlatched position.

As seen in FIG. 21B, first end 248 of keeper 236 may further include an outwardly extending keeper pin 252. As seen in FIG. 20B, keeper pin 252 on first end 248 of keeper 236 may be slidably received within slot 244 defined in top wall 224 of strike housing 222. Second end 250 of keeper 236 may further include an outwardly extending pinion gear 256. As seen in FIGS. 20A, 22A and 22B, pinion gear 256 of second end 250 of keeper 236 may be rotatably and movably received within slot 246 defined in bottom wall 226 of strike housing 222 as will be described in greater detail below. With reference to FIG. 20B, in one embodiment of the present invention, keeper pin 252 may be dimensioned to have a length which extends beyond the thickness of top wall 224 so as to engage blocking member 42 similar to keeper pin 52 described above with regard to electric strike 20*c* (see FIG. 8).

Similar to electric strike 20*c* described above with regard to FIGS. 5-8 and 12, blocking member 42 may be pivotally mounted to the external surface 224*c* of top wall 224 of housing 222 about an axis of rotation, such as via a pivot pin 60. In a locked mode, first portion 62 of blocking member 42 may be configured to selectively engage with plunger 40 of solenoid 38. Second portion 64 of blocking member 42 may selectively engage keeper pin 252 on first end 248 of keeper 236 so as to prevent or permit rotation of blocking member 42 and actuation (rotation and translation) of keeper 236. Blocking member 42 is in an unlocked mode when first portion 62 is not engaged with plunger 40. Again, similar to electric strike 20*c* described in FIG. 5, blocking member 42 may further carry spring post 76 thereon. First extension spring 78 may then be mounted between spring post 76 and keeper pin 252 to bias keeper 236 toward the latched position. Second end 250 of keeper 236 may also be configured to include a roll pin 280 while housing 222 may include a second spring post 282 (FIG. 20B). A second extension spring 284 may then be mounted to roll pin 280 and second spring post 282 to further aid in biasing keeper 236 to the latched position and prevent twisting or tilting of keeper 236 within strike cavity 232. Electric strike 220 further includes rack and pinion assembly 280 comprising slot 246 with teeth 247 of housing 222 and pinion gear 256 on second end 250 of keeper 236 as will be described in greater detail below.

As shown in FIGS. 22A and 22B, an exemplary actuation of keeper 236 from the latched position to the unlatched position to release door latch 18 is generally shown. Initially, blocking member 42 is positioned in the blocking position with keeper pin 252 received within keeper pin channel 86 of blocking member 42 similar to first keeper pin 52 described above with regard to FIGS. 8 and 12. With plunger head 40*a* in a non-engaged position with first indent 66 within first end 62 of blocking member 42 (e.g., withdrawn by powering plunger 38 when in fail-secure mode, or with plunger shaft 40*b* received within first indent 66 when in fail-safe mode) as seen in FIG. 13A, sliding of door 12 toward the open orientation (in direction 19 as shown in FIGS. 1 and 14A), such as by pulling of door handle 16, causes hook portion 18*b* of door latch 18 to impact and drive against an inner surface of extended sidewall portion 255 (FIG. 21B) of keeper 236.

Imposing a force on door latch 18 (such as in direction 19 as shown in FIGS. 14A-14E) causes keeper 236 to rotate relative to strike housing 222 and translate outwardly of strike cavity 232 as keeper pin 252 travels toward top edge 224*a* of slot 244 and pinion gear 256 rotates within slot 246 via engagement of pinion gear teeth 256*a* with rack teeth 247 defined in slot 246 of channel wall 246*a*. Similar to that generally shown in FIGS. 14D and 14E, door latch 18 is permitted to move in direction 19 when keeper 236 is rotated via rack and pinion assembly 280 to that the point where a stop tooth 256*a*' on pinion gear 256 engages channel wall

246*b* of slot 246 until extended sidewall portion 255 is no longer lined up with hook portion 18*b* of door latch 18 and door 12 is free to move within frame 14.

As described above, once hook portion 18*b* clears extended sidewall portion 255, door latch 18 is no longer applying an opening force on keeper 236. Removal of the opening force allows first and second extension springs 78, 284 to release their stored potential energy to thereby retract keeper 236 into strike cavity 232 through a reverse linear and rotational translation of keeper 236. Keeper 236 is thus rotated while rack and pinion assembly 280 rotates in reverse and travels linearly inward within slot 246 such that extended sidewall portion 255 occludes pocket 253*a* to place keeper 236 in the latched position as seen in FIGS. 20A and 22A.

Analogous to FIGS. 15A-15C, in order to close sliding door 12 a force is imposed on door 12 in direction 90 (see e.g., FIGS. 15A-15C) so that door latch 18 engages keeper 236. When door latch 18 engages keeper 236, a curved outer edge 18*b*' of hook portion 18*b* comes into contact with extended sidewall portion 255 of keeper 236. With application of sufficient impact force, hook portion 18*b* is redirected downwardly to clear an edge of sidewall portion 255. To assist downward redirection, extended sidewall portion 255 may include a chamfered face 255*a* which is configured to engage curved outer edge 18*b*' of door latch 18 to cause door latch 18 to travel downward within strike housing 222. With continued impact force applied to door 12, door latch 18 continues to travel in direction 90 and rotation in direction 92 until such time that hook portion 18*b* of door latch 18 clears the edge of extended sidewall portion 255 of keeper 236. Door latch 18 is then biased to rotate such that hook portion 18*b* resides within pocket 253*a* of keeper 236. Door latch 18 is then secured within latch pocket 253*a* of keeper 236 with door 12 in the closed position within frame 14.

While various biasing mechanisms have been described with respect to electric strike 220 to bias keeper 236 to either the latched or unlatched positions, it is contemplated and within the scope of the invention to eliminate one or more of these biasing mechanisms from electric strike 220 in the case where door latch 18 is fixed and not able to pivot relative to the door. In this instance, the force on door latch 18 as it is entering or being removed from keeper 236 would be used to move keeper 236 between latched and unlatched positions.

Figure 1B:
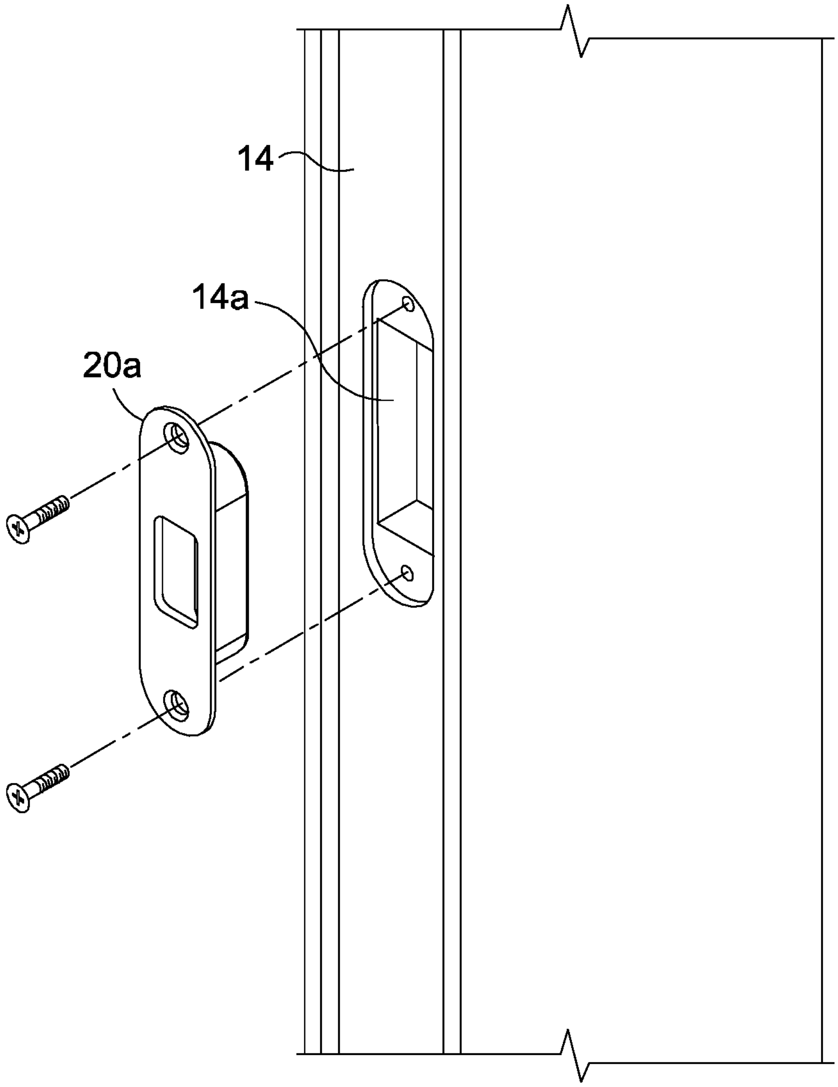
FIG. 1B. PRIOR ART
FIG. 1B is an exploded view of a prior art standard strike mounted in a standard cut-out pocket formed in the door frame.
Figure 1C:
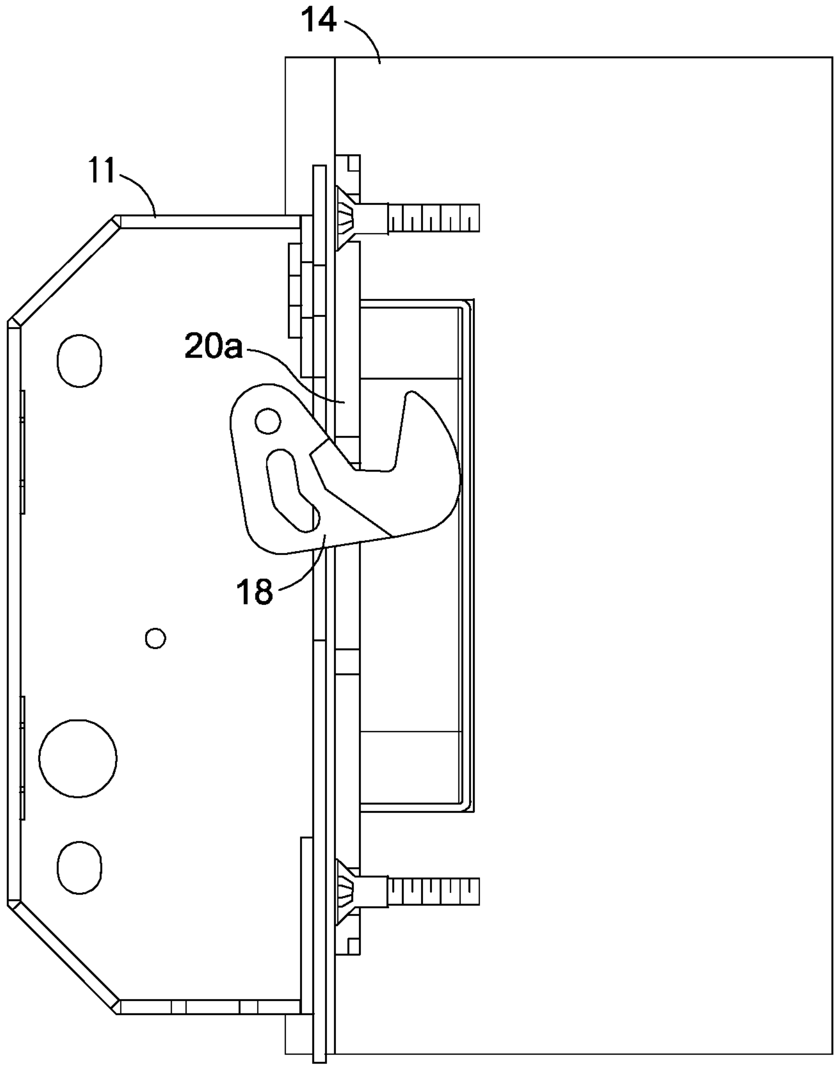
FIG. 1C. PRIOR ART
FIG. 1C is a cross-sectional view of the standard strike shown in FIG. 1B with a hook latch disposed therein in an engaged position.
Figure 1D:
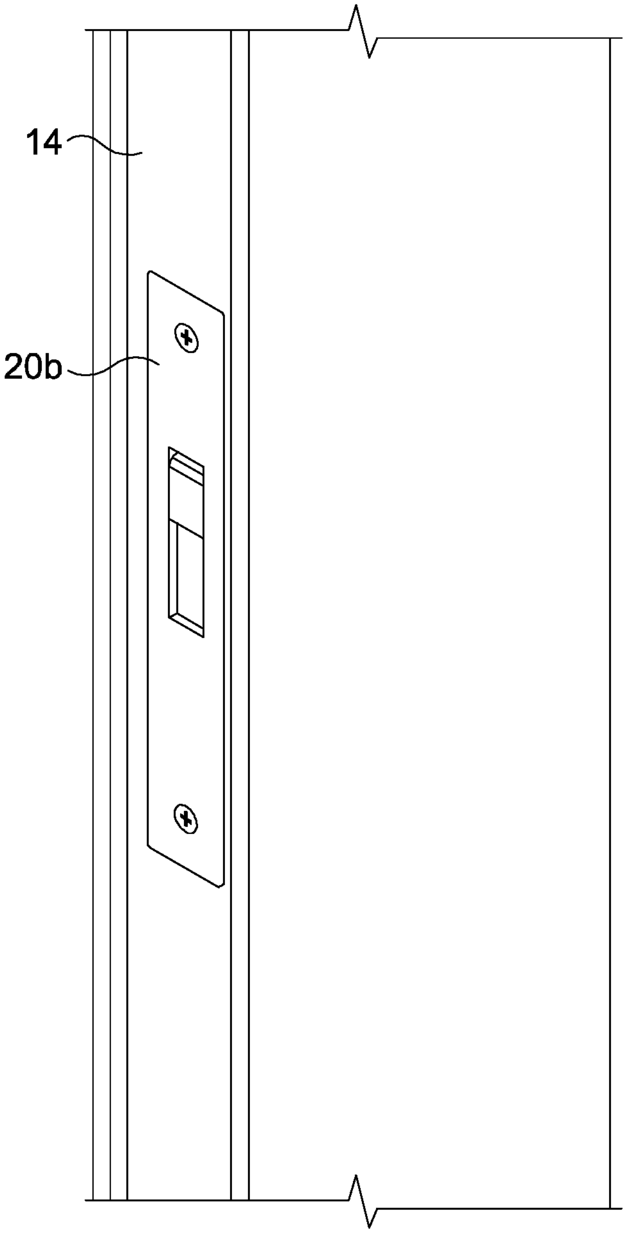
FIG. 1D. PRIOR ART
FIG. 1D is a perspective view showing a prior art electric strike mounted in the door frame.
Figure 1E:
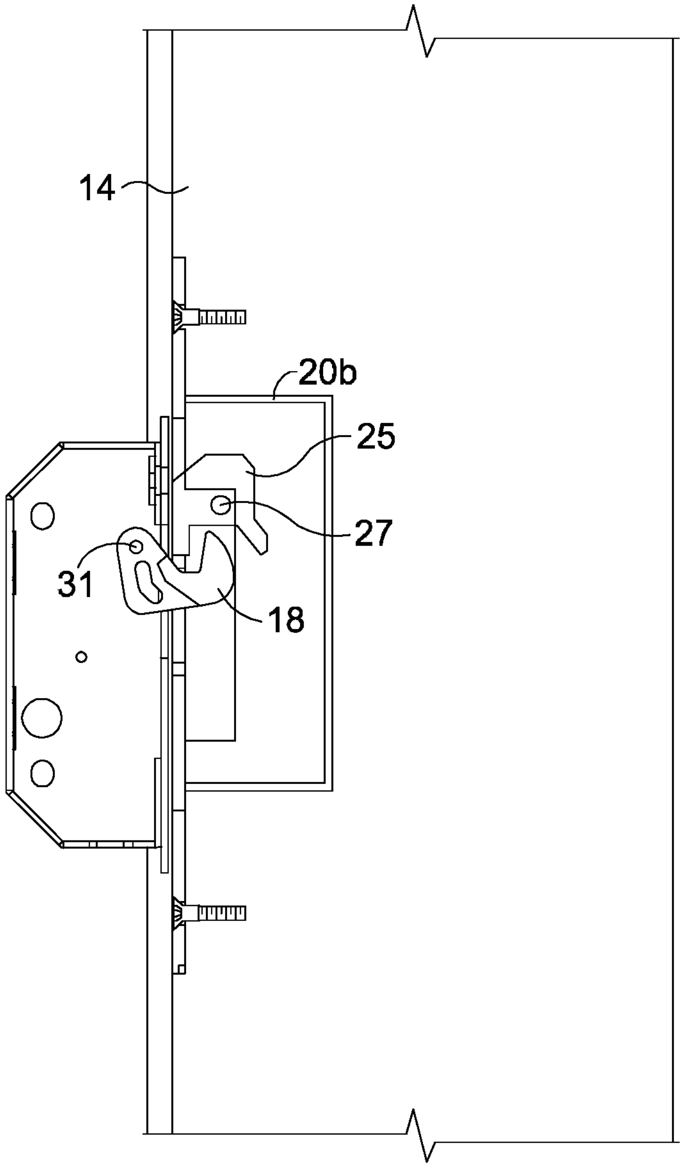
FIG. 1E. PRIOR ART
FIG. 1E is a cross-sectional view of the prior art electric strike shown in FIG. 1D with the hook latch disposed therein in the engaged position.
Figure 1F:
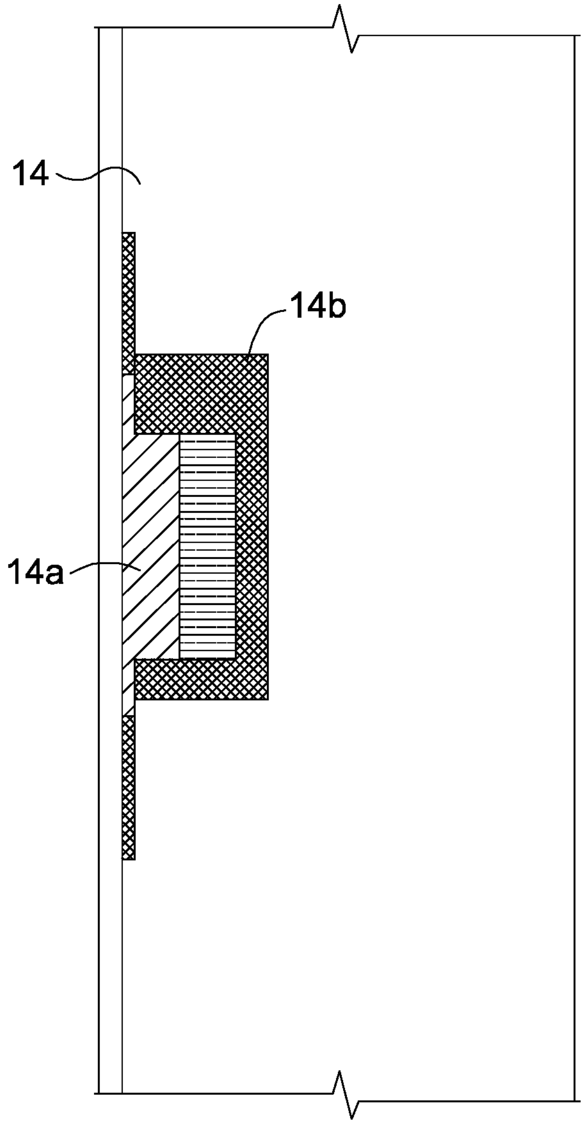
FIG. 1F. PRIOR ART
FIG. 1F is a cross-sectional view of the door frame showing the different cut-out pockets for the standard strike shown in FIG. 1C and FIG. 1D.
Figure 16:
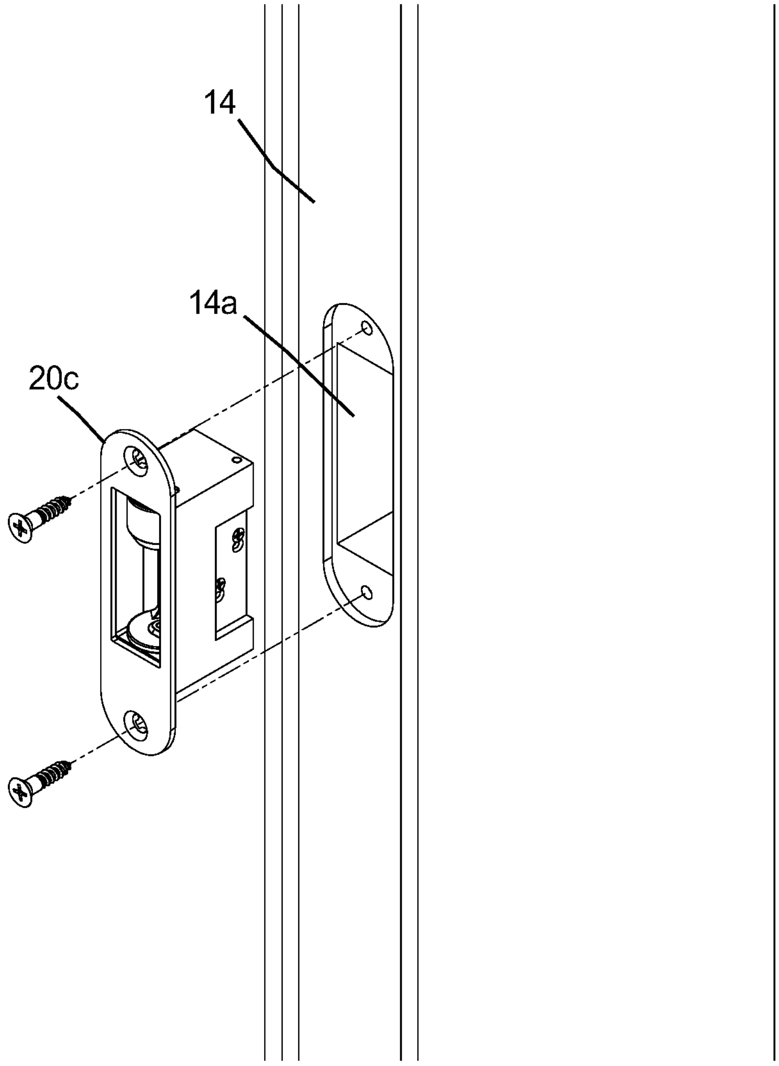
FIG. 16 is an exploded view of the electric strike of the present invention shown in association with the standard cut-out pocket in the frame shown in FIG. 1B.

By providing electric strike 20*c*, 120, 220 in accordance with the present invention numerous advantages are realized. For example, the keeper 36, 236 in the present invention rotates and translates in the manner described which thereby allows electric strike 20*c*, 120, 220 to fit within the same cut-out pocket 14*a* that is used for standard strike 20*a*, as best seen in FIGS. 1B and 16, thereby eliminating the need to make the significant modifications to cut-out pocket 14*a* that are required to accommodate prior art electric strike 20*b* as described above with respect to FIG. 1F. This allows for a more efficient and simplified installation of electric strike 20*c*, 120, 220. Other advantages and benefits will also be realized by those skilled in the art.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An electric strike for use in conjunction with a door latch system of a sliding door, wherein the door latch system includes a door latch selectively moveable between a latched position and an unlatched position, the door strike comprising:

a strike housing defining a strike cavity, wherein the strike housing includes a first wall and a second wall opposing the first wall, wherein a first slot is defined in the first wall, and wherein a second slot is defined in the second wall;

an actuating mechanism including a plunger selectively moveable between a first engaged position and a second released position;

a keeper disposed within the strike cavity and movable between a latched position and an unlatched position, wherein the keeper includes a first end and a second end, wherein each of the first end and the second end include respective outwardly extending first and second keeper pins, wherein the first and second keeper pins extending from the first end of the keeper are configured for being disposed in the first slot, and wherein the first and second keeper pins extending from the second end of the keeper are configured for being disposed in the second slot; and a blocking member pivotably mounted to the strike housing about a first axis, wherein the blocking member includes a first portion and a second portion, wherein the second portion of the blocking member is engaged with the first keeper pin extending from the first end of the keeper when the first portion of the blocking member is selectively engaged with the plunger in the first engaged position to place the keeper in the latched position.

2. The electric strike of claim 1 wherein the first slot includes a stem portion and a leg portion, and wherein the stem portion is oriented generally perpendicular relative to the leg portion.

3. The electric strike of claim 2 wherein the stem portion of the first slot includes a first end and a second end, wherein the first end of the first slot is coterminous with a top edge of the first wall, and wherein the second end of the stem portion extends toward a bottom edge of the first wall.

4. The electric strike of claim 3 wherein the leg portion of the first slot includes a first end and a second end, wherein the first end of the leg portion intersects the second end of the stem portion of the first slot at a first vertex, and wherein the second end of the leg portion extends toward a third wall of the strike housing that extends between the first wall and the second wall.

5. The electric strike of claim 4 wherein the stem portion includes a flared portion adjacent to the first vertex.

6. The electric strike of claim 5 wherein the stem portion of the first slot includes an inner edge and an outer edge, and wherein the inner edge includes the flared portion.

7. The electric strike of claim 4 wherein the stem portion of the first slot includes an inner edge and an outer edge, and wherein the distance between the inner edge and the outer edge at the second end is greater than the distance between the inner edge and the outer edge at the first end.

8. The electric strike of claim 4 wherein the first keeper pin is located at the first vertex of the first slot and the second keeper pin is located at the second end of the leg portion of the first slot when the keeper is in the latched position.

9. The electric strike of claim 4 wherein the first keeper pin is located at the first end of the stem portion of the first slot and the second keeper pin is located at the first vertex of the first slot when the keeper is in the unlatched position.

10. The electric strike of claim 1 further comprising a first extension spring having a first end and a second end, wherein the first end of the first extension spring is coupled to the blocking member at a first point, wherein the second end of the first extension spring is coupled to the first keeper pin of the first end of the keeper at a second point, and wherein the first extension spring biases the keeper towards the latched position.

11. The electric strike of claim 10 further comprising a biasing assembly proximate the second wall of the strike housing, wherein the biasing assembly includes a compression spring having a first end coupled to the strike housing and a second end coupled to the second end of the keeper, wherein the compression spring biases the keeper towards the unlatched position.

12. The electric strike of claim 11 wherein a spring constant of the compression spring is greater than a spring constant of the first extension spring.

13. The electric strike of claim 10 wherein the first axis, the second point, and the plunger are co-linear with one another.

14. The electric strike of claim 10 further comprising a second extension spring having a first end and a second end, wherein the first end of the second extension spring is coupled to the strike housing, wherein the second end of the second extension spring is coupled to a roll pin disposed adjacent to the second end of the keeper, and wherein the second extension spring biases the keeper towards the latched position.

15. The electric strike of claim 1 wherein the keeper further includes a sidewall extending between the first end and the second end of the keeper, wherein the sidewall defines a latch cavity configured to receive the door latch therein.

16. The electric strike of claim 15 wherein the sidewall of the keeper further includes an extended sidewall portion configured to retain the door latch within the latch cavity when the keeper is in the latched position, and wherein the extended sidewall portion is configured to release the door latch from the latch cavity when the keeper translates and rotates from the latched position to the unlatched position as the door is moved to an open position.

17. The electric strike of claim 16 wherein the keeper simultaneously translates and rotates from the latched position to the unlatched position.

18. The electric strike of claim 16 wherein the keeper rotates between about 1 degree and about 180 degrees relative to the strike housing from the latched position to the unlatched position.

19. The electric strike of claim 1 further comprising a plunger support wall mounted to the strike housing, wherein the plunger support wall is configured for being disposed adjacent to the plunger when the plunger is in the engaged position.

20. A method for selectively securing a door within a door frame, wherein the door includes a door latch system including a door latch selectively moveable between a latched position and an unlatched position, the method comprising the steps of:

a) providing an electric door strike including:

i) a strike housing defining a strike cavity, wherein the strike housing includes a first wall and a second wall opposing the first wall, wherein a first slot is defined in the first wall, and wherein a second slot is defined in the second wall;

ii) an actuating mechanism including a plunger selectively moveable between a first engaged position and a second released position;

iii) a keeper disposed within the strike cavity and movable between a latched position and an unlatched position, wherein the keeper includes a first end and an second end, wherein each of the first end and the second end include respective outwardly extending first and second keeper pins, wherein the first and second keeper pins extending from the first end of the keeper are configured for being disposed in the first slot, and wherein the first and second keeper pins extending from the second end of the keeper are configured for being disposed in the second slot; and iv) a blocking member pivotably mounted to the strike housing about a first axis, wherein the blocking member includes a first portion and a second portion, wherein the first portion is adapted to selectively engage the plunger and the second portion is adapted to selectively engage the first keeper pin on the first end of the keeper;

b) placing the plunger in engagement with the first portion of the blocking member so that the second portion of the blocking member is engaged with the first keeper pin on the first end of the keeper to place the keeper in the latched position and retain the door latch in a latch cavity defined by the keeper;

c) operating the actuating mechanism to disengage the plunger from the first portion of the blocking member; and d) allowing the keeper to be placed in the unlatched position by an opening force being imposed on the keeper by the door latch through the movement of the door toward an open position, wherein the keeper is placed in the unlatched position through a translational and rotational movement caused by sliding the first keeper pin and the second keeper pin on each of the first end and second end of the keeper within the first slot and the second slot, respectively, to allow the door latch to be removed from the latch cavity.

21. The method of claim 20 wherein the first slot includes a stem portion and a leg portion, and wherein the stem portion is oriented generally perpendicular relative to the leg portion.

22. The method of claim 21 wherein the stem portion of the first slot includes a first end and a second end, wherein the first end of the first slot is coterminous with a top edge of the first wall, and wherein the second end of the stem portion extends toward a bottom edge of the first wall.

23. The method of claim 22 wherein the leg portion of the first slot includes a first end and a second end, wherein the first end of the leg portion intersects the second end of the stem portion of the first slot at a first vertex, and wherein the second end of the leg portion extends toward a third wall of the strike housing extending between the first wall and the second wall.

24. The method of claim 23 wherein the stem portion includes a flared portion adjacent to the first vertex.

25. The method of claim 24 wherein the stem portion of the first slot includes an inner edge and an outer edge, and wherein the inner edge includes the flared portion.

26. The method of claim 23 wherein the stem portion of the first slot includes an inner edge and an outer edge, and wherein the distance between the inner edge and the outer edge at the second end is greater than the distance between the inner edge and the outer edge at the first end.

27. The method of claim 23 wherein the first keeper pin is located at the first vertex of the first slot and the second keeper pin is located at the second end of the leg portion of the first slot when the keeper is in the latched position.

28. The method of claim 27 wherein the first keeper pin is located at the first end of the stem portion of the first slot and the second keeper pin is located at the first vertex of the first slot when the keeper is in the unlatched position.

29. The method of claim 20 wherein the electric door strike further includes a first extension spring having a first end and a second end, wherein the first end of the first extension spring is coupled to the blocking member at a first point, wherein the second end of the first extension spring is coupled to the first keeper pin of the first end of the keeper at a second point, and wherein the first extension spring biases the keeper towards the latched position.

30. The method of claim 29 wherein the electric door strike further comprises a biasing assembly proximate the second wall of the strike housing, wherein the biasing assembly includes a compression spring having a first end coupled to the strike housing and a second end coupled to the second end of the keeper, wherein the compression spring biases the keeper towards the unlatched position.

31. The method of claim 30 wherein a spring constant of the compression spring is greater than a spring constant of the first extension spring.

32. The method of claim 29 wherein the first axis, the second point, and the plunger are co-linear with one another.

33. The method of claim 29 wherein the electric door strike further comprises a second extension spring having a first end and a second end, wherein the first end of the second extension spring is coupled to the strike housing, wherein the second end of the second extension spring is coupled to a roll pin disposed adjacent to the second end of the keeper, and wherein the second extension spring biases the keeper towards the latched position.

34. The method of claim 20 wherein the keeper further includes a sidewall extending between the first end and the second end of the keeper, wherein the sidewall defines the latch cavity.

35. The method of claim 34 wherein the sidewall of the keeper further includes an extended sidewall portion configured to retain the door latch within the latch cavity when the keeper is in the latched position, and wherein the extended sidewall portion is configured to release the door latch from the latch cavity when the keeper translates and rotates from the latched position to the unlatched position as the door is moved to the open position.

36. The method of claim 20 further comprising a plunger support wall mounted to the strike housing, wherein the plunger support wall is disposed adjacent to the plunger when the plunger is in the engaged position.

37. The method of claim 20 wherein the keeper is placed in the unlatched position through simultaneous translational and rotational movement caused by sliding the first keeper pin and the second keeper pin on each of the first end and second end of the keeper within the first slot and the second slot, respectively, to allow the door latch to be removed from the latch cavity.

38. The method of claim 20 wherein the keeper rotates between about 1 degree and about 180 degrees relative to the strike housing from the latched position to the unlatched position.

* * * * *